United States Patent
Tari et al.

(10) Patent No.: US 6,542,491 B1
(45) Date of Patent: Apr. 1, 2003

(54) WIRELESS SERVER, SYSTEM AND METHOD

(75) Inventors: Kazuyoshi Tari, Omiya (JP); Tumoru Nagira, Omiya (JP); Hiroyuki Unoki, Omiya (JP); Kenichi Murayama, Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/397,699

(22) Filed: Sep. 16, 1999

(30) Foreign Application Priority Data

| Sep. 16, 1998 | (JP) | 10-262099 |
| Sep. 30, 1998 | (JP) | 10-294592 |
| Oct. 29, 1998 | (JP) | 10-309228 |
| Oct. 29, 1998 | (JP) | 10-309231 |
| Dec. 18, 1998 | (JP) | 10-361659 |

(51) Int. Cl.[7] .............. H04Q 7/24; H04Q 7/20; G06F 15/16
(52) U.S. Cl. ............ 370/338; 370/356; 370/401; 455/433; 455/445; 709/203
(58) Field of Search .................. 370/328, 329, 370/331, 338, 351, 352, 402, 389, 390, 432, 401, 353, 354, 356, 358; 709/201, 202, 203; 455/433, 445, 450

(56) References Cited

U.S. PATENT DOCUMENTS

| 5,572,528 A | * | 11/1996 | Shuen | 370/402 |
| 5,619,552 A | * | 4/1997 | Karppanen et al. | 455/433 |
| 5,745,884 A | * | 4/1998 | Carnegie et al. | 705/34 |
| 5,825,759 A | * | 10/1998 | Liu | 370/331 |
| 5,862,345 A | * | 1/1999 | Okanoue et al. | 709/238 |
| 6,108,727 A | * | 8/2000 | Boals et al. | 710/68 |
| 6,281,790 B1 | * | 8/2001 | Kimmel et al. | 340/506 |

FOREIGN PATENT DOCUMENTS

| EP | 0 938 217 | 8/1999 |
| JP | 1-177232 (63-000477) | 7/1989 |
| JP | 8-181713 | 7/1996 |
| JP | 11-055317 | 2/1999 |
| JP | 11-088433 | 3/1999 |
| JP | 11-308273 | 11/1999 |

* cited by examiner

Primary Examiner—Hassan Kizou
Assistant Examiner—Afsar M. Qureshi
(74) Attorney, Agent, or Firm—Oblon, Spivak, McClelland, Maier & Neustadt, P.C.

(57) ABSTRACT

A wireless server system and method for communicating between a user terminal and Internet a wirelessly. It is based on a user terminal having a fixed terminal and a terminal unit so that an Internet connection can be made by way of the terminal unit to an appropriate wireless server. The system has at least one wireless server connected to Internet; and a plurality of wireless station devices connected to the wireless server, and the system communicates wirelessly with the terminal unit of the user terminal; wherein one wireless server within a district of communication range of the wireless station devices is designated as a home server for the terminal unit, and the fixed terminal receives data sent wirelessly from Internet by way of the terminal unit.

29 Claims, 28 Drawing Sheets

FIG. 26A

| DISTRICT NAME | USEABLE CHANNEL NUMBER |
|---|---|
| a | 1, 2, 3, 4, 5, 6 |
| b | 1, 5, 6, 7, 9 |
| c | 1, 2, 6, 7, 8 |
| d | 9, 10, 11, 12 |

FIG. 26B

| CHANNEL NUMBER | PERMISSIBLE FREQUENCY |
|---|---|
| 1 | f1 |
| 2 | f2 |
| 3 | f3 |
| 4 | f4 |
| 5 | f5 |
| 6 | f6 |
| 7 | f7 |
| 8 | f8 |
| 9 | f9 |
| 10 | f10 |
| 11 | f11 |
| 12 | f12 |

FIG. 27

| CHANNEL NUMBER | OPERATING DISTRICT NAMES | NUMBER OF DISTRICTS | PERMISSIBLE RECEIVING FREQUENCY |
|---|---|---|---|
| 1 | a, b, c | 3 | f1 |
| 2 | a, c | 2 | f2 |
| 5 | a, b | 2 | f5 |
| 6 | a, b | 2 | f6 |
| 7 | b, c | 2 | f7 |
| 9 | b, d | 2 | f9 |
| 3 | a | 1 | f3 |
| 4 | a | 1 | f4 |
| 8 | c | 1 | f8 |
| 10 | d | 1 | f10 |
| 11 | d | 1 | f11 |
| 12 | d | 1 | f12 |

FIG. 28

| CHANNEL NUMBER | OPERATING DISTRICT NAMES | NUMBER OF DISTRICTS | PERMISSIBLE RECEIVING FREQUENCY |
|---|---|---|---|
| 1 | | | f1 |
| 2 | | | f2 |
| 5 | | | f3 |
| 6 | | | f4 |
| 7 | | | f5 |
| 9 | | | f6 |
| 3 | | | f7 |
| 4 | | | f8 |
| 8 | | | f9 |
| 10 | | | f10 |
| 11 | | | f11 |
| 12 | | | f12 |

WIRELESS SERVER, SYSTEM AND METHOD

BACKGROUND OF THE INVENTION

1. Field of the Invention

The present invention relates in general to wireless servers for communicating user terminal devices wirelessly to Internet, and relates in particular to a wireless server system that can provide a seamless service to a terminal unit when the terminal unit moves from one managing district to another managing district.

2. Description of the Related Art

There has been an increasing need for mobile computing in recent years. Mobile computing performs information processing by connecting to an existing Internet service network through a mobile-phone circuit, for example. A feature of the circuit used for mobile computing is that it enables communications from mobile sites by utilizing mobile phone circuits.

However, communication devices dependent on the conventional wired communication network operate on communication protocols that are designed for fixed communication services, and present a problem that communication is terminated when a terminal unit moves to a location beyond the capability of sub-net services. Further, there are problems of excessive time of waiting to be connected to the telephone network, and if the line is congested, it may be impossible to secure a line.

SUMMARY OF THE INVENTION

It is an object of the present invention to address the above-identified and other short-comings of conventional systems and methods. A consistent object is to provide a communication system and method that can continue to communicate without using telephone circuits, even when a terminal unit moves out of a sub-net district.

The objects are achieved in a wireless server system and method, for wirelessly connecting a terminal unit having a terminal device and wireless mobile device to the Internet, including not less than one wireless server for communicating with Internet; and a plurality of wireless station devices connected to the wireless server for wireless communication with the terminal unit by way of the wireless mobile device; wherein one wireless server within a district of communication range of the wireless station devices is designated as a home server for the wireless mobile device, and the terminal device communicates with Internet by way of the wireless mobile device.

An advantage of the present server system and method is that, because one wireless server is designated as the home server for the wireless mobile device, within a managing district of the home server that can communicate with the wireless mobile devices and the home server performs the tasks of approving a terminal connection and issuing an Internet Protocol, IP, address, the mobile device is able to carry on communicating in managing districts other than the managing districts of the home server.

The objects have also been achieved in a wireless mobile device that includes a memory section for storing a last operational frequency used by the wireless mobile device and down-frequencies of a peripheral wireless station device; a read-only-memory section for storing permissible operational frequencies for sending and receiving data through the wireless mobile device; and a judging section for comparing frequencies stored in the memory section and permissible operational frequencies stored in the read-only-memory section, and judging whether or not an operational frequency to be used by the wireless mobile device is useable; wherein up-frequencies transmitted from the wireless station device are tested by using successively the last receiving frequency, the down-frequencies of the peripheral wireless station device and the permissible receiving frequencies so that a terminal registration request is transmitted only when a received up-frequency matches a receiving frequency permitted for the wireless mobile device.

An advantage of the present wireless mobile device is that it is only necessary to search among the down-frequencies of the peripheral station devices to find a useable frequency, because a down-frequency can be selected by the wireless terminal unit for sending a terminal registration request to a wireless server.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 26 is a diagram of the table containing permissible receiving frequencies 27a shown in FIG. 25;

FIG. 27 is an illustration of the priority table 24d shown in FIG. 25;

FIG. 28 is an illustration of the priority table 24d shown in FIG. 25; and

DESCRIPTION OF THE PREFERRED EMBODIMENTS

The following embodiments are presented for illustrative purposes only and are not meant to limit the invention defined by the appended claims. Also, to achieve the above-described and other objectives, not all combinations of features presented in the embodiments are required at all times.

Embodiment 1

Figure 1:
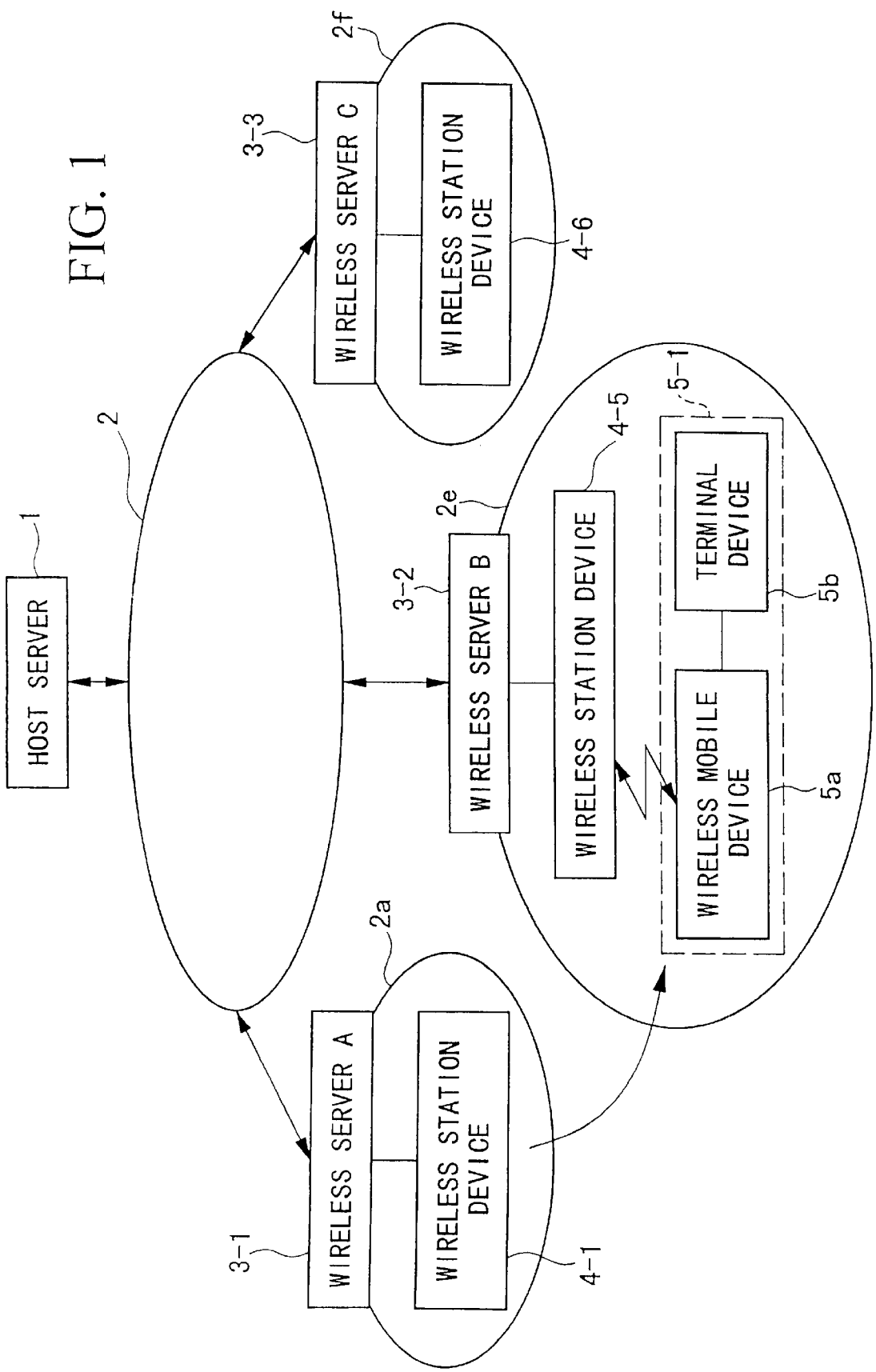
FIG. 1 is a block diagram of a structure of a wireless network according to Embodiment 1 of the present invention.

In the following, the wireless server system will be presented with reference to the drawings. FIG. 1 shows a block diagram of the structure of the system in Embodiment 1. The system includes: a host server 1; a network 2 connected to the first server 1; wireless servers 3-1~-3 connected to the network 2; sub-networks 2a, 2e, 2f, which are managed by the wireless servers 3-1~3; and wireless station devices 4-1, 4-5, 4-6 connected to respective wireless servers 3-1~3. Normally, a plurality of immobile wireless station devices 4-n are connected to one wireless server 3-n, but in this illustration, only one station device 4-n is shown for one wireless server 3-n. The system serves terminal units, represented in this case by one terminal unit 5-1, connected to the wireless server 3-2 for wireless communication with the wireless station devices 4-5. The terminal unit 5-1 includes a wireless mobile device 5a and a computer terminal (referred to hereinbelow as the terminal device) 5b connected to the wireless mobile device 5a.

The host server 1 may be a wireless server to communicate with the terminal, but it does not necessarily have a wireless communication function.

Any one of the wireless servers 3-n connected to the network 2 can serve as the home server for the terminal unit 5-1. In the diagram shown in FIG. 1, the wireless server 3-3 is designated as the home server for the terminal unit 5-1.

Next, the operation of the wireless server system of Embodiment 1 will be explained with reference to FIGS. 1, 2, 3, 4, 5 and 6.

Figure 2:
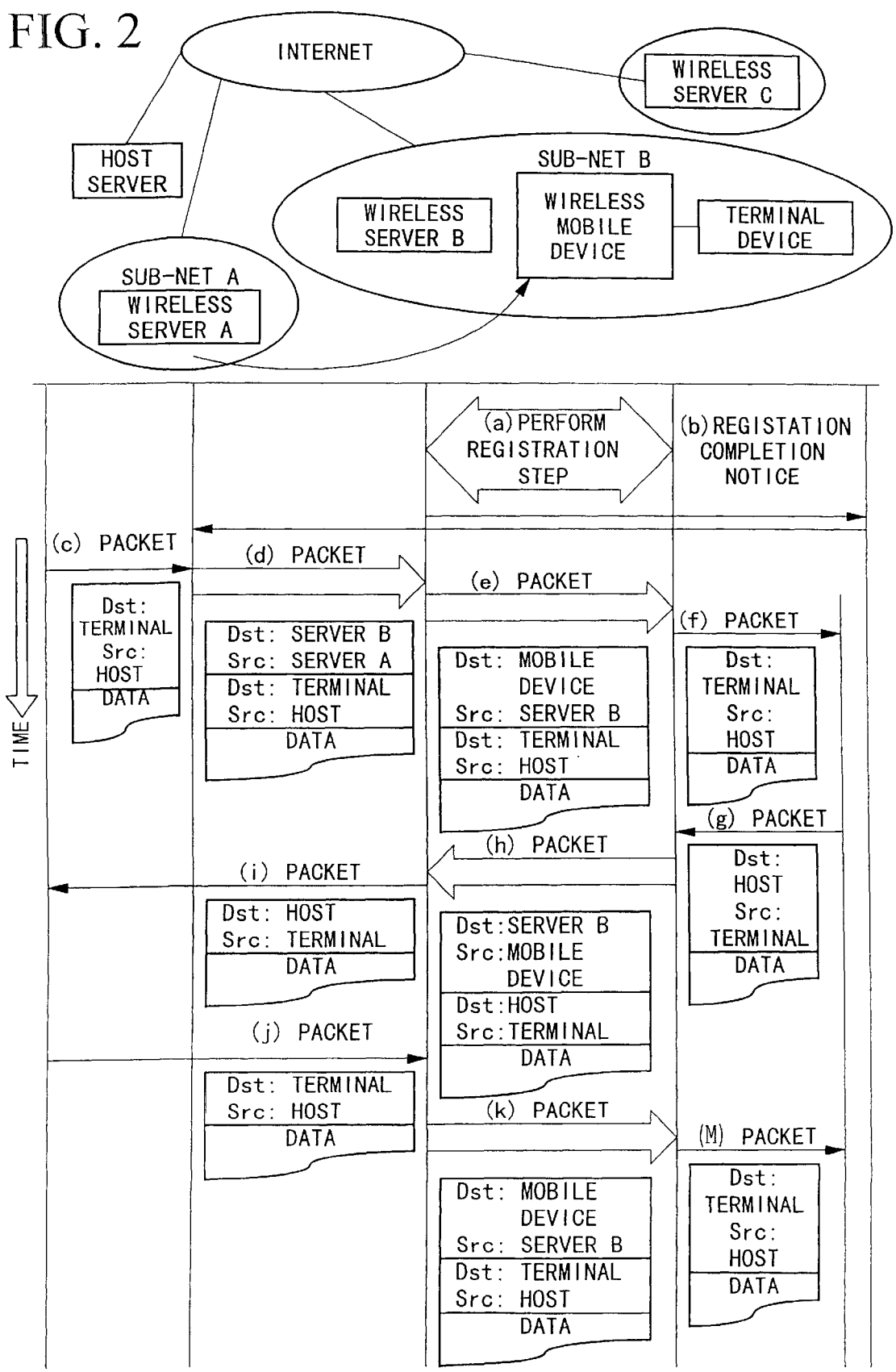
FIG. 2 is a schematic illustration of a process of packet transmission in Embodiment 1.

FIG. 2 illustrates the operation of the wireless server system to manage the movement of a terminal unit. Mailing destination is indicated by "dst" and mailing source is indicated by "src". FIGS. 3, 4, 5 and 6 are flowcharts for the operational steps of the wireless server system.

In this case, It is assumed that the home server for the terminal unit 5-1 is the wireless server C3-3, and that the terminal unit 5-1 is presently operating under the direction of the wireless server A3-1.

First, the following explanation pertains to the operation of the system when the terminal unit 5-1 moves from sub-network 2a managed by the wireless server A3-1 to sub-network 2e managed by the wireless server B3-2. The terminal unit 5-1 requests from wireless server B3-2 a terminal registration approval and an IP address (refer to (a) in FIG. 2, step S1 in FIG. 3). In response, wireless server B3-2 issues registration approval and an IP address (refer to (a), and step S2 in FIG. 3), thus enabling the terminal unit 5-1 to operate under the wireless server B3-2.

Processes for approving the terminal registration request and issuing an IP address will be explained later.

Figure 3:
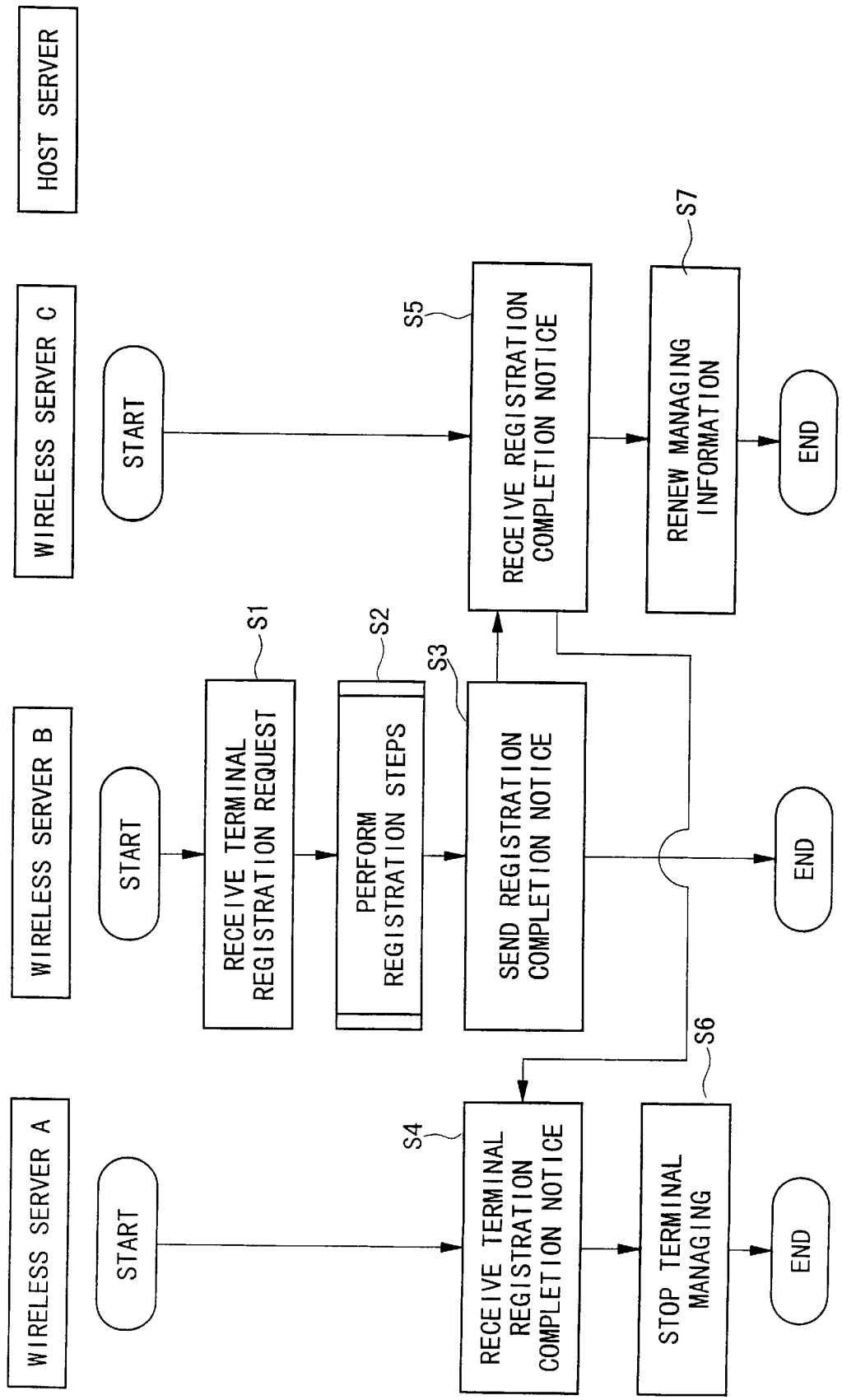
FIG. 3 is a flowchart for a registration portion of a process of packet transmission in Embodiment 1.

Next, wireless server B3-2 notifies the wireless server C3-3, which is the home server for the terminal unit 5-1, that the terminal unit 5-1 has moved from the managing district of wireless server A3-1 to the managing district of wireless server B3-2, and that the terminal registration has been effected (refer to (b) in FIG. 2, and step S3 in FIG. 3).

Next, in response to the registration completion report from wireless server B3-2, the wireless server C3-3, as the home server, notifies wireless server A3-1 that the terminal unit 5-1 has moved into the managing district of wireless server B3-2 (step S5 in FIG. 3). Accordingly, upon receiving the registration completion report from the wireless server C3-3 (step S4 in FIG. 3), wireless server A3-1 stops managing the terminal unit 5-1 (step S6 in FIG. 3). In the meantime, wireless server C3-3 (home server) records that the terminal unit 5-1 is now in the managing district of B3-2, thereby updating the managing information (step S7 in FIG. 3).

The reason for using the home server C3-3 to notify wireless server A3-1 that the terminal unit 5-1 has moved is that, by so doing, the home server will be able to recognize the managing district in which the terminal unit 5-1 is now operating.

By following the above steps, the terminal unit 5-1 can move about to other managing districts.

Next, the steps for the host server 1 to transmit a packet to the terminal unit 5-1 will be explained with reference to FIGS. 2 and 4.

Figure 4:
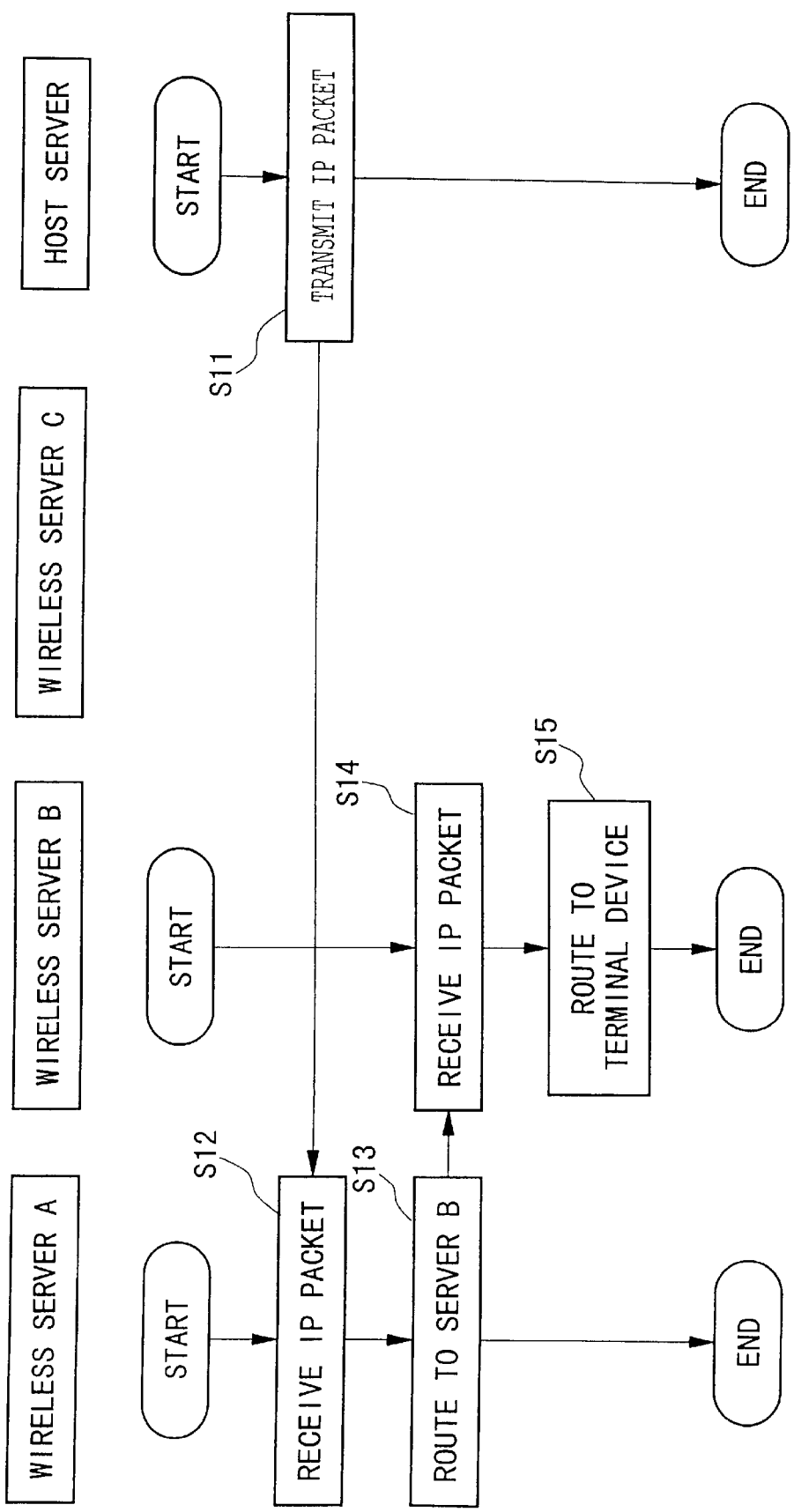
FIG. 4 is a flowchart for a host server packet transmit portion of the process of packet transmission in Embodiment 1.

First, the host server 1 transmits an IP packet through the network 2 (step S11 in FIG. 4). At this time, because the host server 1 has not been notified of the movement of the terminal unit 5-1 to managing district B3-2, the packet is sent to wireless server A3-1 to which the terminal unit 5-1 had been connected previously (refer to (c) in FIG. 2).

Upon receiving the packet in wireless server A3-1 (step S12 in FIG. 4), the packet is routed to wireless server B3-2 (step S13 in FIG. 4, and (d) in FIG. 2), and is received by wireless server B3-2 (step S14 in FIG. 4). Further, wireless server B3-2 routes the packet to the wireless mobile device 5a of the terminal unit 5-1 which is operating within its managing district (step S15 in FIG. 4), and the packet is delivered to the wireless mobile device 5a (refer to (e) in FIG. 2), and from there to the terminal device 5b (refer to (f) in FIG. 2).

The packet forwarded from the host server 1 is thus received by the terminal unit 5-1.

Next, the steps for sending a packet from the terminal unit 5-1 to the host server 1 will be explained with reference to FIGS. 2, 5 and 6.

First, the terminal device 5b transmits a packet to the wireless mobile device 5a ((g) in FIG. 2). Next, the wireless mobile device 5a transmits the packet to the host server 1 by way of the wireless server B3-2 ((h) in FIG. 2).

Figure 5:
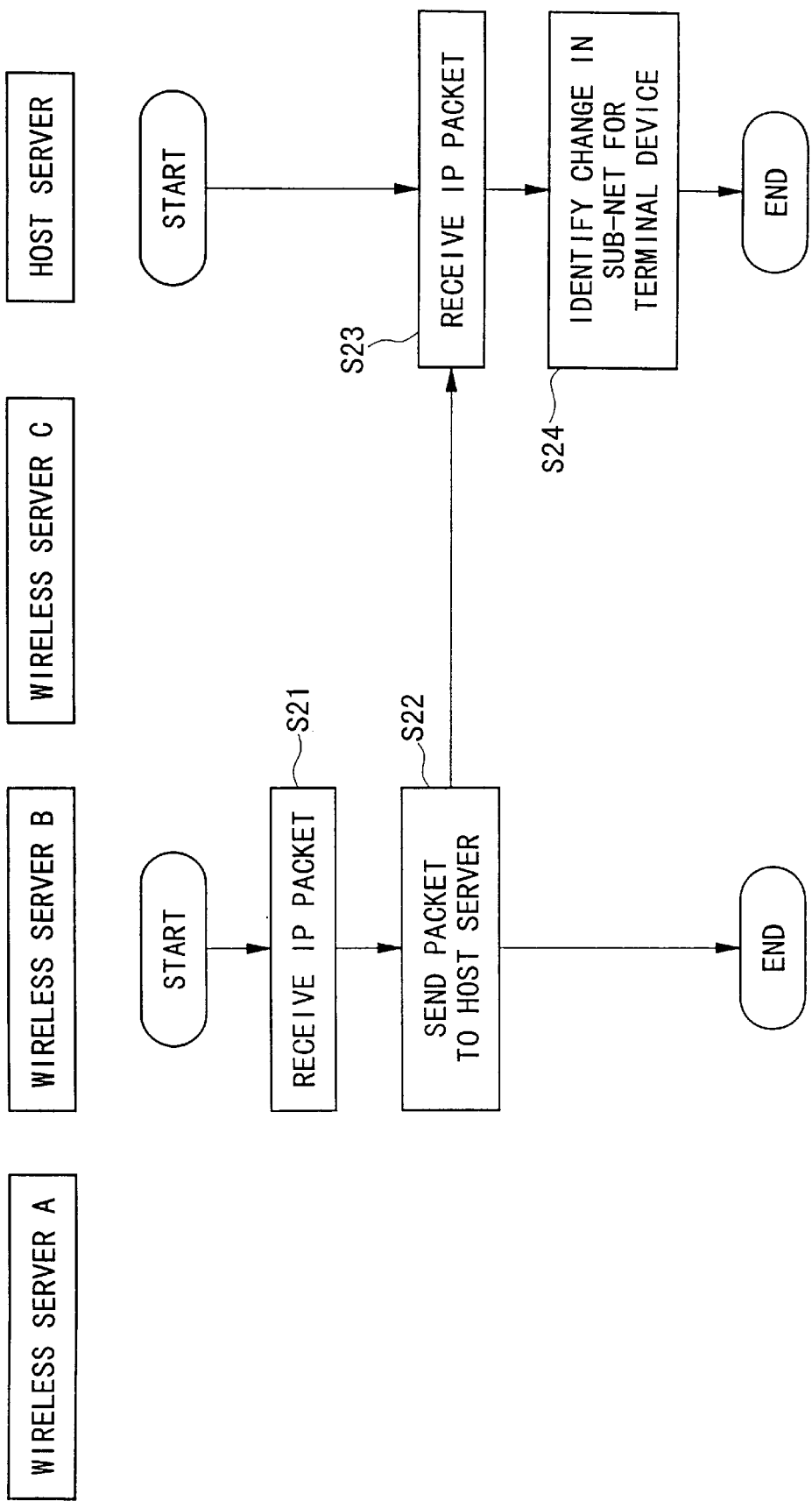
FIG. 5 is a flowchart for a terminal transmit portion of the process of packet transmission in Embodiment 1.

Next, wireless server B3-2 receives the packet (step S21 in FIG. 5) and routes the packet to the host server 1 and sends the packet received from the terminal unit 5-1 to the host server 1 ((i) in FIG. 2, step S22 in FIG. 5).

Next, the host server 1 receives the packet (step S23 in FIG. 5). Upon receiving the packet, the host server 1 now knows that the terminal unit 5-1 is in the managing district of wireless server B3-2 because of the source address of the packet (step) S24 in FIG. 5). Therefore, all subsequent packet transmission to the terminal unit 5-1 will be made directly to wireless server B3-2.

Figure 6:
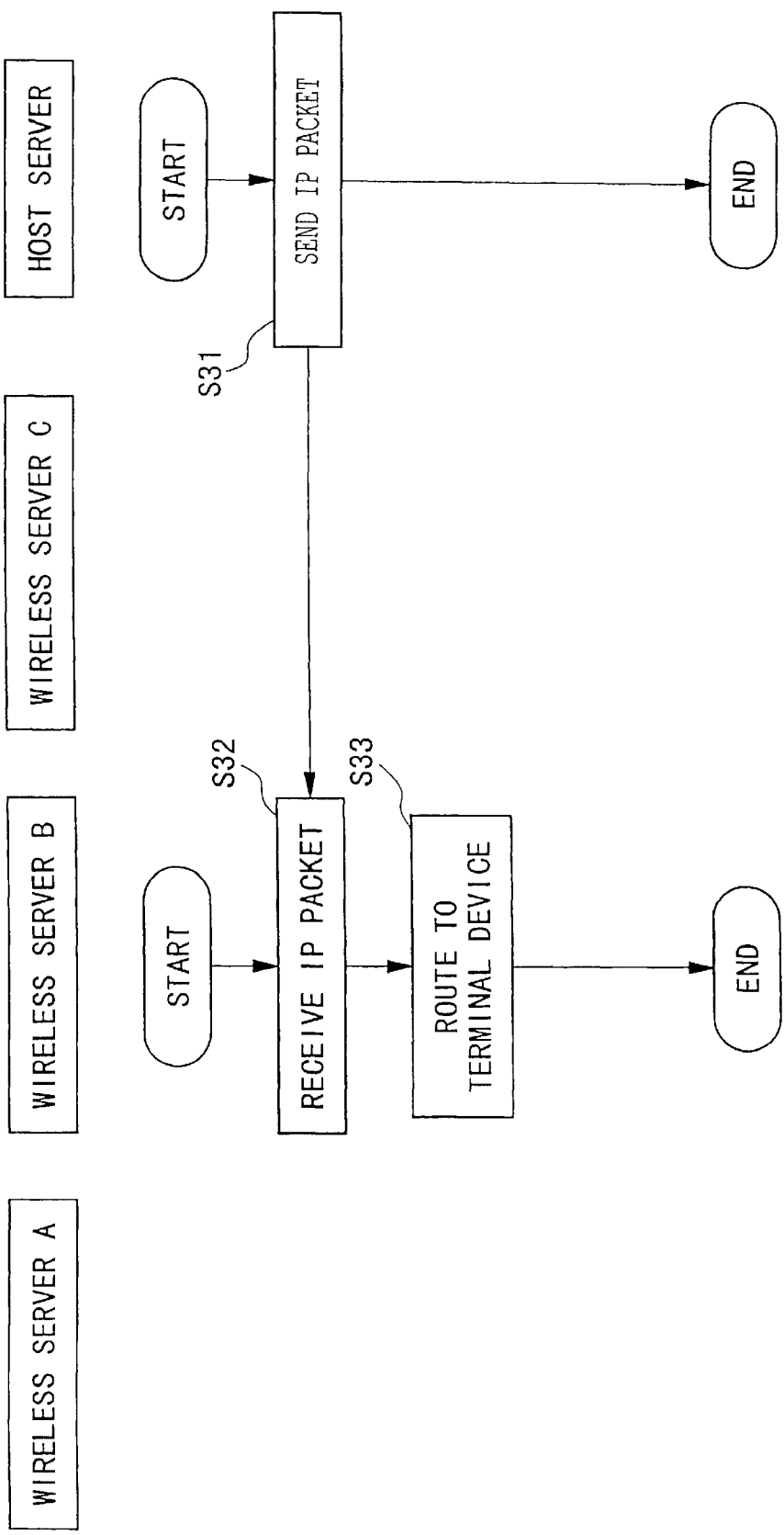
FIG. 6 is a flowchart for another portion of the process of packet transmission in Embodiment 1.

Next, the process of sending the packet from the host server 1 to the wireless server B3-2 is carried out by first sending the packet to wireless server B3-2 ((j) in FIG. 2, step S31 in FIG. 6).

Next, the wireless server B3-2 receives the packet (step S32 in FIG. 6), and routes it to the terminal unit 5-1 (step S33 in FIG. 6) and delivers the packet to the wireless mobile device 5a ((k) in FIG. 2), from which the packet is sent to the terminal device 5b ((in) in FIG. 2).

The above manner of only informing the host server when a packet is sent from the terminal unit 5-1 provides an advantage of avoiding congestion of data traffic because of the elimination of the necessity of informing all the host servers on each move of the terminal unit 5-1.

Figure 7:
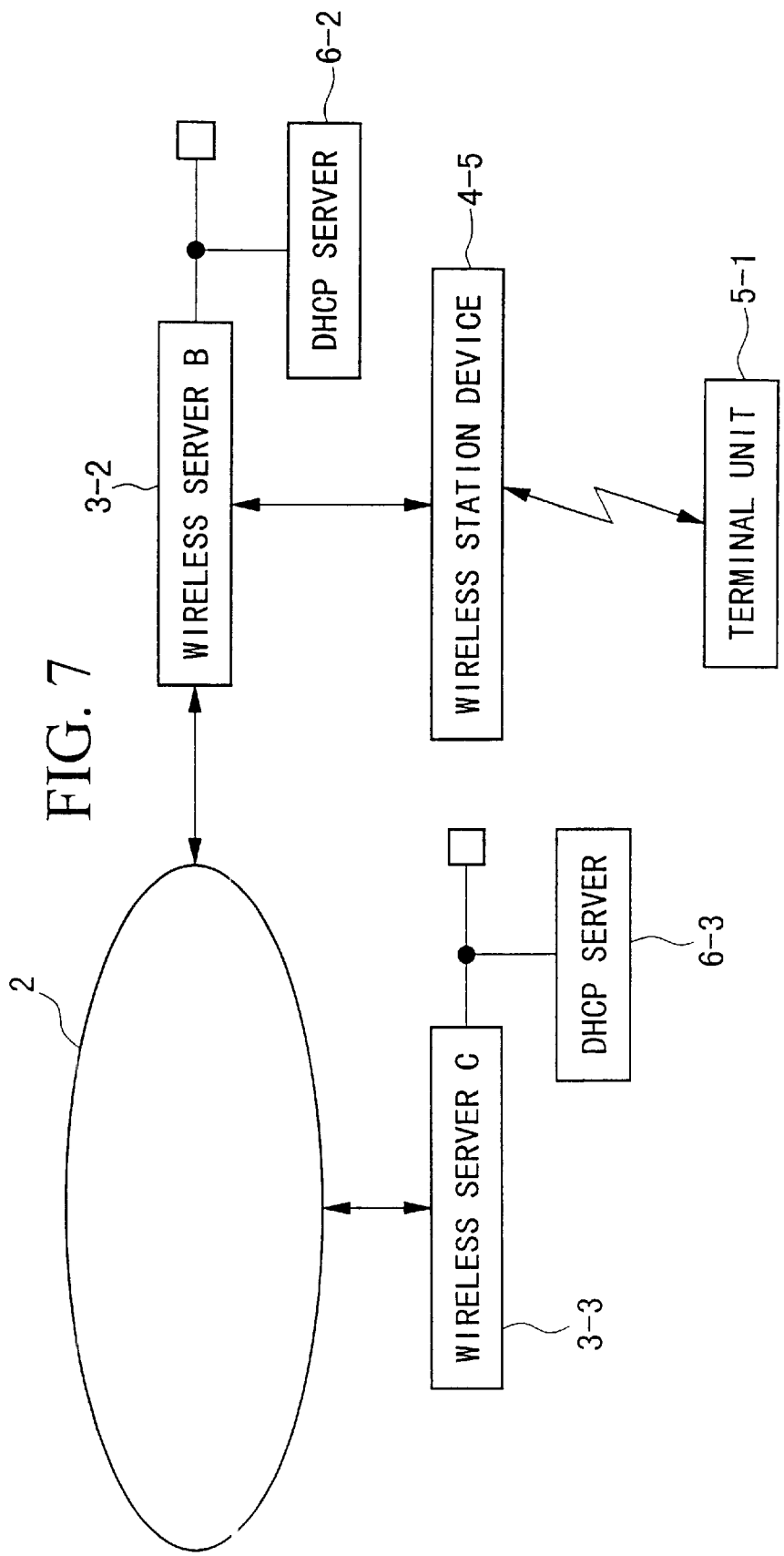
FIG. 7 is an illustration of steps for issuing addresses in Embodiment 1.

Next, the operation of issuing an IP address will be explained with reference to FIG. 7.

First, when the terminal unit 5-1 moves into the managing district of wireless server B3-2, the terminal unit 5-1 sends an IP address request to the wireless server B3-2.

Next, the wireless server B3-2 deduces the home server for the terminal unit 5-1 (wireless server C3-3 is the home server in this case), and sends an IP address request to the wireless server C3-3.

Next, an IP address allocation request is made to DHCP wireless server 6-3, which is a wireless server for issuing IP addresses and is connected to the wireless server C3-3 (home server). In response, DHCP wireless server 6-3 issues an IP address presently available for use, and the wireless server C3-3 is informed of the IP address issued.

Next, the wireless server C3-3 forwards the issued IP address to the terminal unit 5-1 by way of the wireless server B3-2.

In this process, if the wireless server B3-2 is the home server for the terminal unit 5-1, an IP address is obtained directly from a DHCP wireless server 6-2.

The above process of issuing an IP address provides an advantage that even when the terminal unit 5-1 is operating under the managing district of wireless server B3-2, an IP address issued by the wireless server C3-3 can be used as though the terminal unit 5-1 is operating in the managing district of wireless server C3-3, so that the packet transmission to the terminal unit 5-1 is allowed to be carried out by way of the wireless server B3-2.

Figure 8:
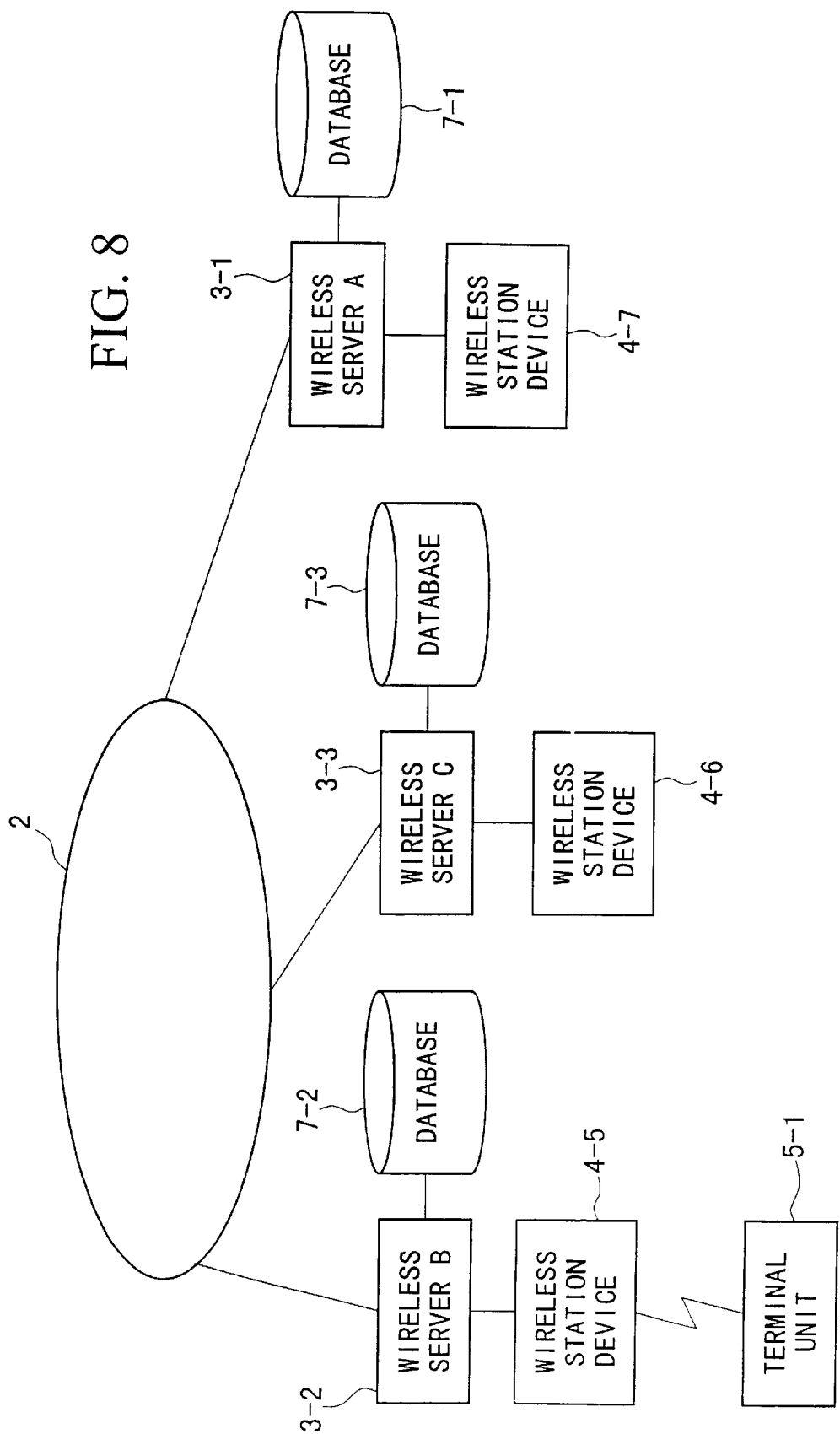
FIG. 8 is an illustration of an exemplary system component layout for terminal identification in Embodiment 1.

Next, the process of approving a terminal registration request will be explained with reference to FIGS. 8 and 9.

Figure 9:
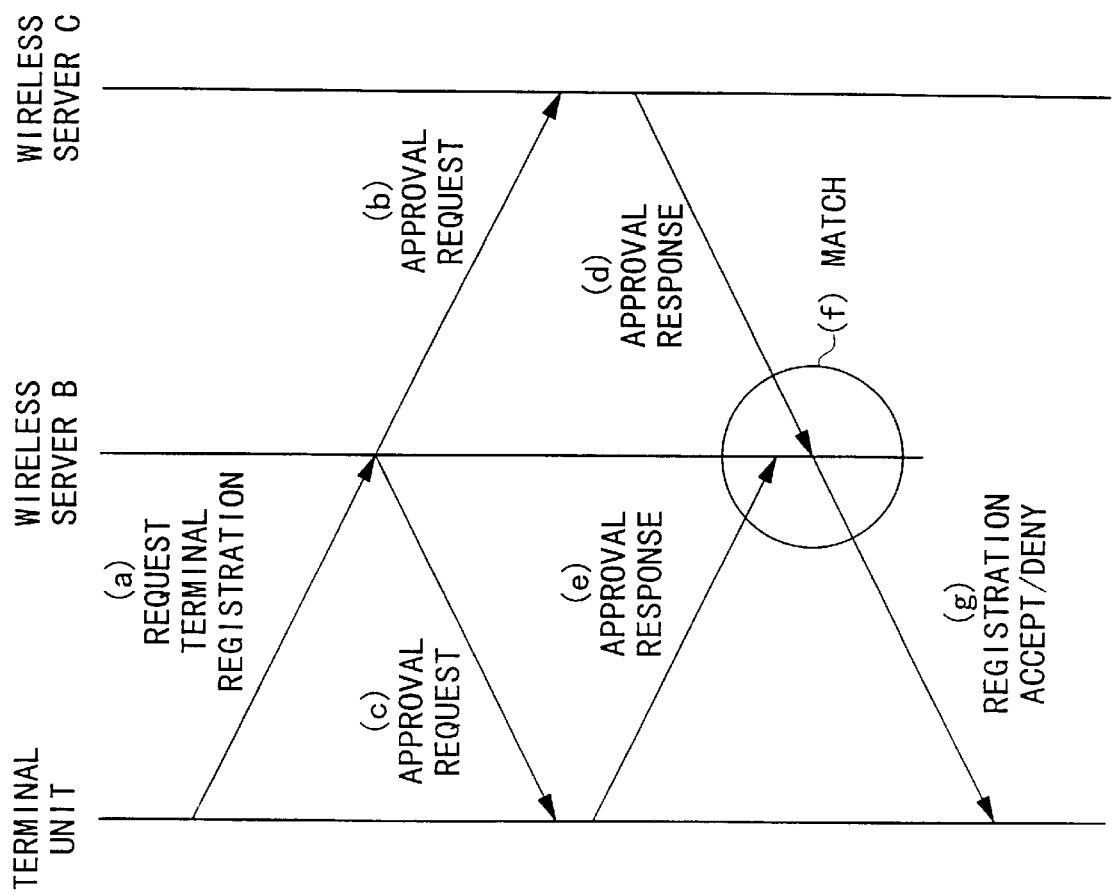
FIG. 9 is an illustration of the steps for terminal identification in Embodiment 1.

First, the terminal unit 5-1 sends a terminal registration request and its identifier number to the wireless server B3-2 ((a) in FIG. 9).

Next, the wireless server B3-2 searches in the database 7-2 connected to the wireless server B3-2 to find out whether or not the identification data of the terminal unit 5-1 is included. If the identification data do not exit in the database 7-2, the wireless server B3-2 judges that it is not the home server for the terminal unit 5-1, and deduces the home server for the terminal unit 5-1 according to the identifier number received, and transfers the approval request to the home server (in this case, wireless server C3-3) ((b) in FIG. 9).

At this time, if the home server cannot be deduced from the identifier number of the terminal unit 5-1 received, the terminal registration request is sent to a pre-determined wireless server (wireless server A3-1, in this case). If the identifier number is not included in the database 7-1 of wireless server A3-1, the terminal registration request is sent to a predetermined wireless server (wireless server C3-3, in this case). These actions are repeated until the home server of the terminal unit 5-1 is notified of the terminal registration.

In the above process, the registration request is accompanied by the identifier number of the terminal unit 5-1 and a random number generated by the wireless server B3-2. This random number is sent to the terminal unit 5-1 also ((c) in FIG. 9).

Next, the wireless server C3-3 which is the home server for the terminal unit 5-1 receives the approval request, and performs an approval computation using the random number and the identifier number received from the wireless server B3-2.

Next, the wireless server C3-3 returns the result of approval computation to the wireless server B3-2 ((d) in FIG. 9).

In the meantime, the terminal unit 5-1 performs an approval computation using the random number received from the wireless server B3-2, and returns the result to the wireless server B3-2 ((e) in FIG. 9).

Next, the wireless server B3-2 compares the results of approval computation received from the wireless server C3-3 and the terminal unit 5-1 ((f) in FIG. 9). Then, when the check process shows that the two are identical, the registration request is approved ((g) in FIG. 9). If the check reveals that the two are not identical, it regards that the registration request is improper, and denies the approval request.

On the other hand, if the identification data exist in the database 7-2, the wireless server receiving the approval request is the home server for that wireless mobile device, therefore, approval operation consists only of: "registration request" ((a) in FIG. 9), "approval request" ((c) in FIG. 9), "approval response" ((e) in FIG. 9), "registration acceptance" ((g) in FIG. 9).

Accordingly, approval for a terminal registration for the terminal unit 5-1 can be carried out even when the terminal unit 5-1 is not under the managing district of a wireless server which is its home server.

Embodiment 2

Next, the operation of the wireless server B3-2 in issuing an IP address will be explained in more detail.

Figure 10:
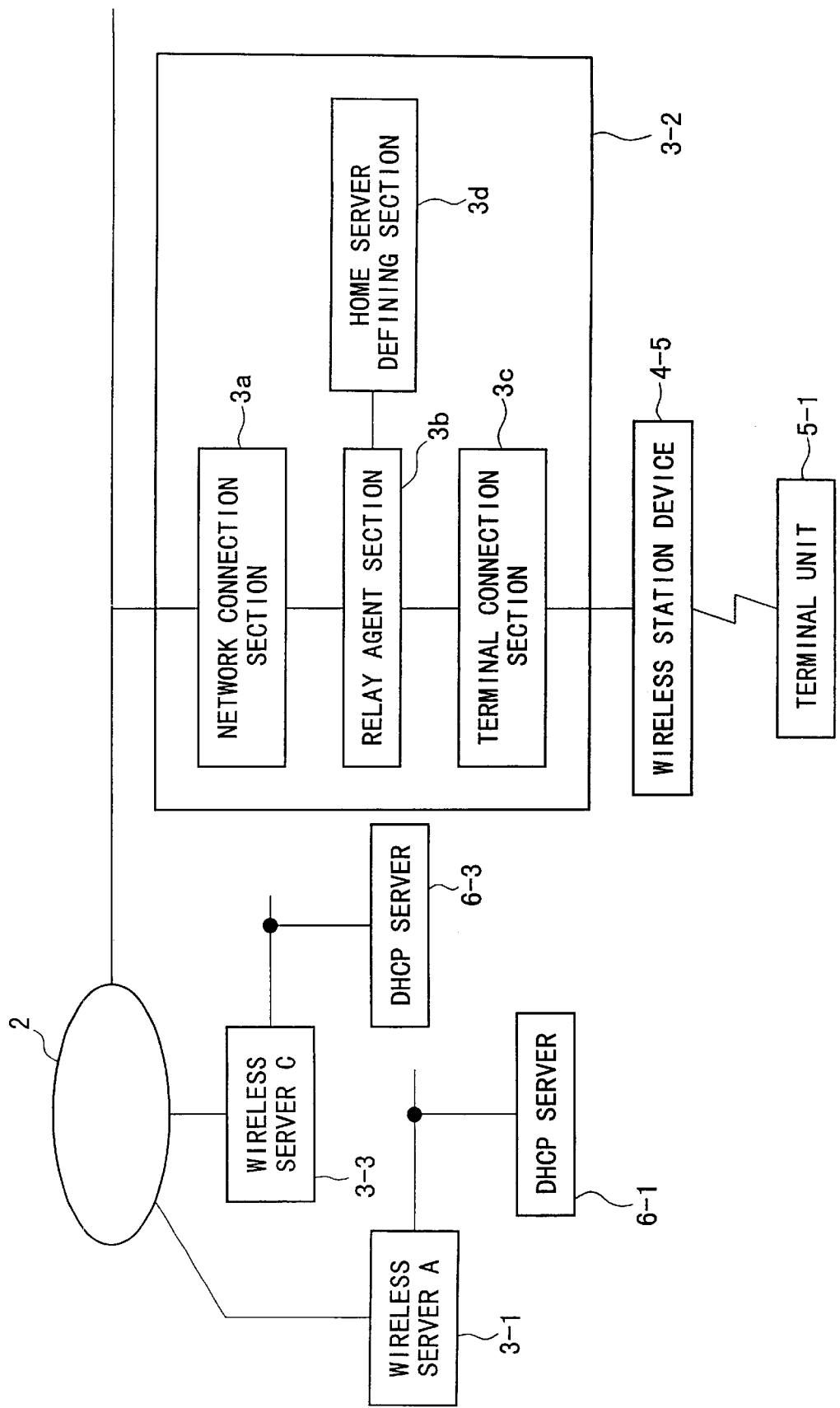
FIG. 10 is a block diagram of a structure of a wireless server B according to Embodiment 2 of the present invention.

FIG. 10 shows a block diagram of the structure of the wireless server B3-2 including a network connection section 3a for connecting to the network 2; a relay agent section 3b for sending an address request to DHCP wireless server 6-3, in response to an IP address request sent from the terminal unit 5-1, and receiving the IP address issued by DHCP wireless server 6-3; a terminal connection section 3c for establishing communication with the terminal unit 5-1 by way of the wireless station device 4-5; and a home server defining section 3d for defining the home servers for individual wireless mobile devices.

Figure 11:
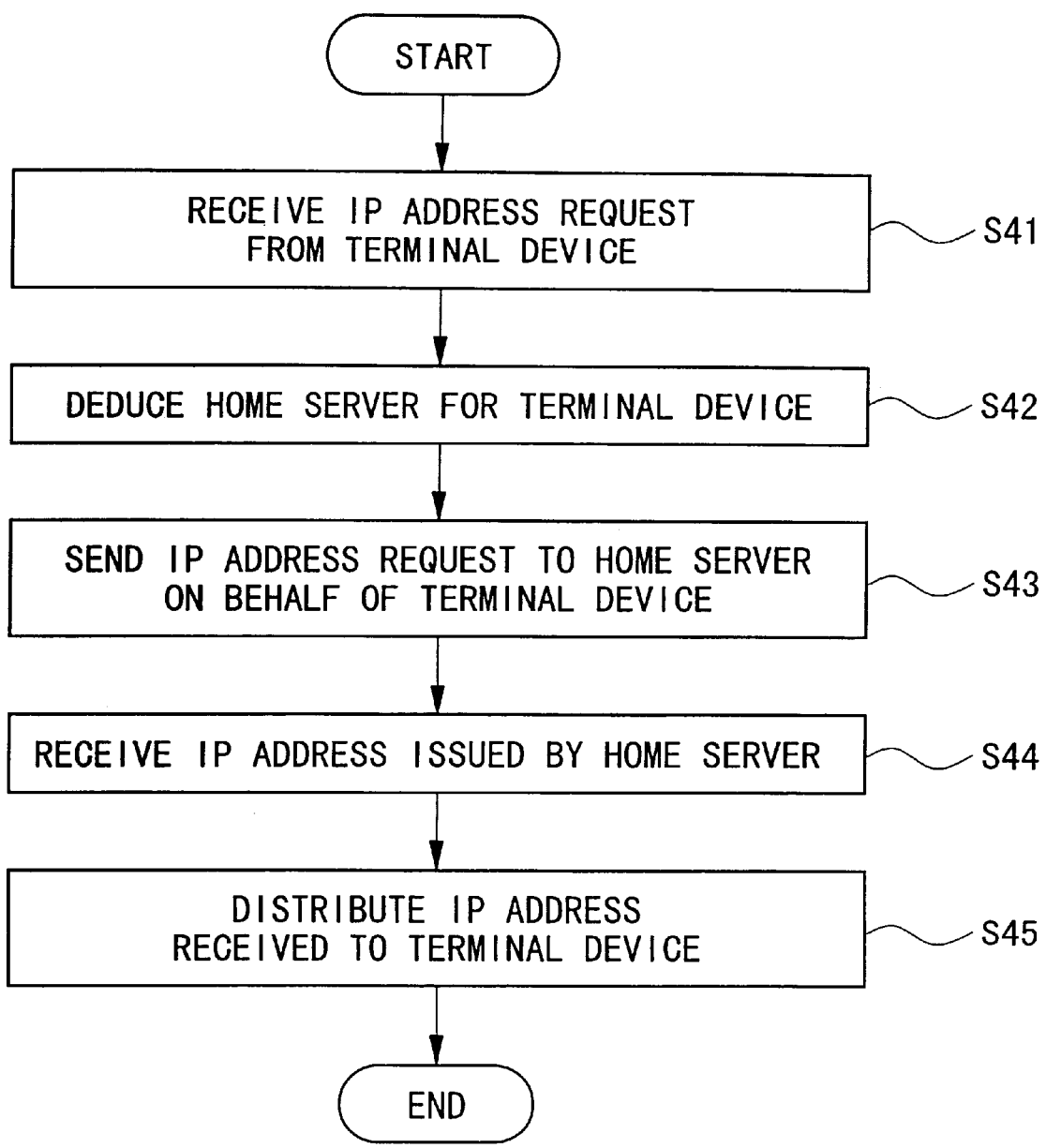
FIG. 11 is a flowchart for steps taken by a wireless server B in Embodiment 2.

Next, the process of issuing an IP address from the wireless server B3-2 will be explained with reference to FIGS. 10, 11. FIG. 11 shows a flowchart showing the steps taken by the wireless server B3-2.

First, the terminal connection section 3c in the wireless server B3-2 receives an IP address request sent from the terminal unit 5-1 by way of the wireless station device 4-5 (step S41). At this time, the terminal unit 5-1 broadcasts (meaning sending the same packet simultaneously to all the devices connected within the network) the IP address request. In response, the wireless server B3-2 judges whether the IP address request is from the terminal unit 5-1 and if it is, the IP address request is accepted.

The IP address request packet includes the identifier ID for the terminal unit 5-1 that is sending the request. The identifier ID is a media access control (MAC) address belonging to the terminal unit 5-1. A MAC address is an identifier number allocated to the hardware of the terminal unit 5-1.

Next, when the received packet is an IP address request from the terminal unit 5-1, the terminal connection section 3c forwards the received packet to the relay agent section 3b.

Then, the relay agent section 3b extracts from its content the identifier ID of the terminal unit 5-1, and by consulting the contents of the home server defining section 3d, deduces an identifier ID to correspond to the wireless mobile device making the request (step S42).

The home server defining section 3d is provided with a table relating identifiers IDs of individual terminal unit 5-1 and the IP addresses of home servers of terminal unit 5-1 corresponding to the identifier IDs. By consulting the table, the relay agent section 3b deduces the IP address of the home server for the terminal unit 5-1 having the identifier ID received therein.

Next, the relay agent section 3b sends an IP address request packet on behalf of the terminal unit 5-1 to the home server (wireless server C3-3 in this case) through the network connection section 3a (step S43). At this time, the source address of the sent packet is the IP address of the wireless server B3-2, and the destination address is the IP address of the deduced home server.

Here, if the data of the terminal unit 5-1 do not exist the home server defining section 3d of the wireless server B3-2, i.e., when the home server cannot be deduced from the received identifier ID, the IP address request is sent to a pre-determined wireless server (A-3, in this case). If the data do not exist in the home server defining section 3d of the second wireless server, the IP address request is sent to another pre-determined wireless server (C3-3, in this case). By repeating the steps until the home server of the terminal unit 5-1 is found, the IP address request is delivered to the home server of the terminal unit 5-1. Accordingly, a home server for a terminal unit can be deduced under any circumstance.

Next, the wireless server C3-3 receiving the IP address request packet sends an IP address request to the DHCP wireless server 6-3. In response to the request, the DHCP wireless server 6-3 issues an IP address presently available for use, and sends it to the wireless server C3-3. In response, the wireless server C3-3 sends the packet containing the IP address issued by the DHCP wireless server 6-3 to the wireless server B3-2 that sent the IP address request packet.

Next, the network connection section 3a receives the packet sent by the wireless server C3-3 (step S44). The network connection section 3a judges whether the received packet is a response packet replying to the IP address request, and when it is the response packet, the packet is forwarded to the relay agent section 3b.

Next, the relay agent section 3b receiving the response packet from the network connection section 3a attaches the identifier ID of the terminal unit 5-1, and forwards the packet to the terminal connection section 3c.

Next, the terminal connection section 3c distributes the response packet to the terminal unit 5-1 by broadcasting (step S45). Then, the terminal unit 5-1 checks whether the identifier ID is included in the broadcast packet for the terminal unit 5-1, and if it is contained, the terminal unit 5-1 extracts the IP address from the packet.

The process of issuing an IP address to a terminal unit 5-1 presently requesting an IP address, from a wireless server that is not the home server provides an advantage that any terminal unit is able to access any other wireless servers without changing the settings of the IP address of the terminal unit 5-1.

Also, normal broadcasting systems do not allow a terminal unit to broadcast beyond own network (with which it is presently communicating) to other terminal units connected to other networks. However, the present broadcast system allows an IP address request to be made to a DHCP wireless server connected to any network, because of the provision of a relay agent section for sending/receiving an IP address request packet on behalf of the terminal unit.

Embodiment 3

Figure 12:
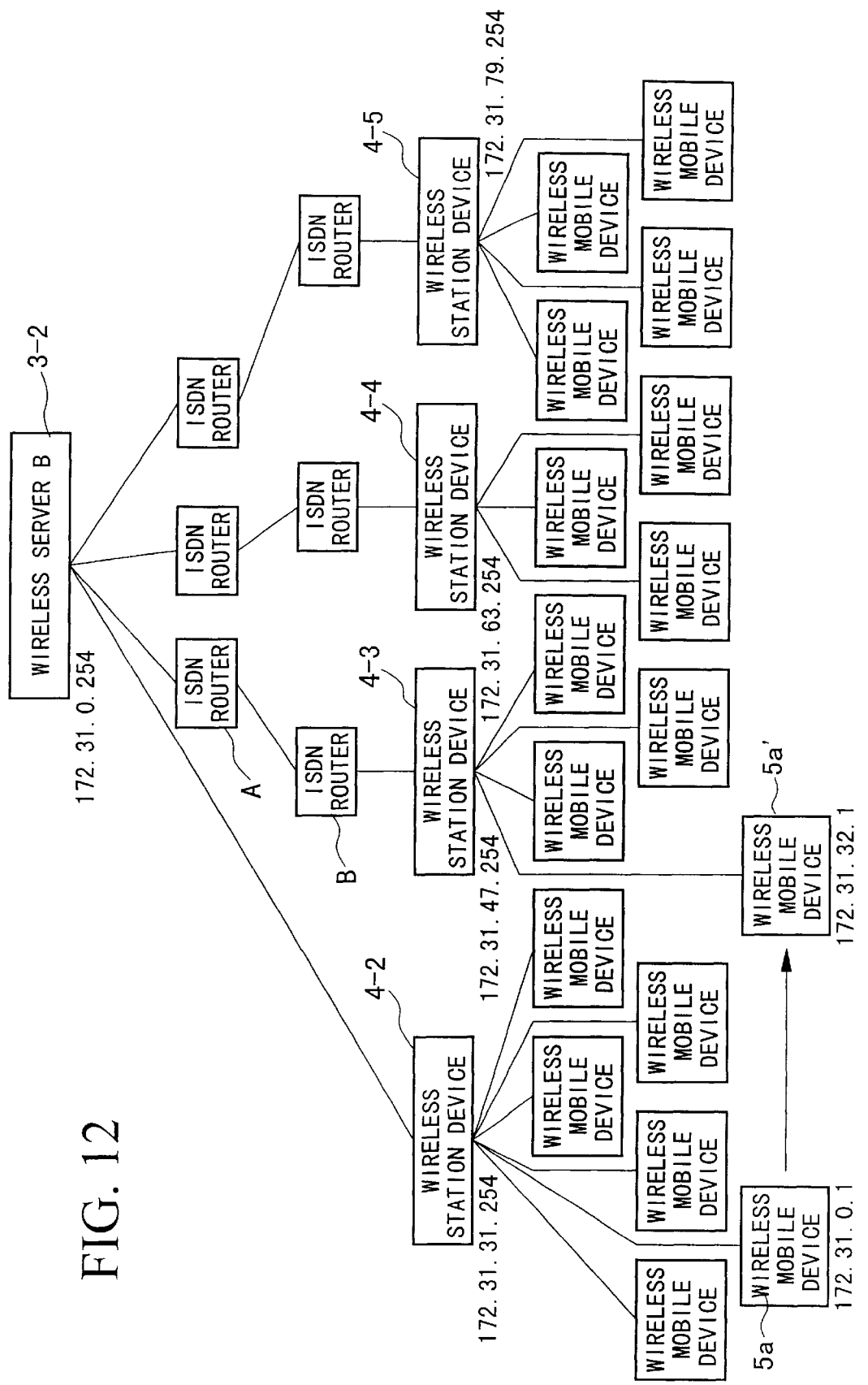
FIG. 12 is an illustration of an address system used in Embodiment 3 of the present invention.

Next, an address address band system for the wireless server B3-2, wireless station devices 4-2-5 and the wireless mobile device 5a will be explained with reference to FIG. 12. In FIG. 12, an IP address for the wireless server B3-2 is assumed to be, for example, [172.31. 0.254], and the IP addresses for the wireless station devices 4-2-5 to be [172. 31. 31. 254], [172. 31. 47. 254], [172. 31. 63. 254][172. 31. 79. 254], respectively.

Also, an IP address of one wireless mobile device 5a among the many wireless mobile devices communicating with the wireless station devices 4-2-5 is assumed to be [172. 31. 0. 1].

An IP address is usually expressed in 32-bits and decimal notation, and each group of 8-bits is separated by a period [.]

In the following explanation, the numerals separated by [.] are referred to, from the left, as first numeral, second numeral, third numeral and fourth numeral.

The third numerals [31], [47], [63], and [79], in the wireless station devices 4-2-5, are expressed so that the higher 4-bits are [0001], [0010], [0011], [0.100] and all the lower bits are [1111]. Also, the third and fourth numeral for all the wireless station devices are pre-selected for each device by the respective wireless server. As an example, all the wireless station devices can be expressed as [1111110] (representing 254 in decimal notation). The lower 4-bits in the third numeral and the numeral [1111 1111 110] represented by the fourth numeral indicate that this device is a wireless station device, and the upper 4-bits in the third numeral distinguish individual wireless station devices.

Also, the first numeral and the second numeral represent the wireless server B3-2 to which the wireless station devices 4-2-5 are connected.

Such designations by IP addresses allow to identify a wireless server connected to each of the wireless station devices 4-2-5 as well as to identify the numerical order of the devices within the station.

With respect to identifying the wireless mobile device 5a, the lower 12-bits of the 32-bit IP address are assigned by the wireless server B3-2. Therefore, it is possible to know to which wireless station device the wireless mobile device 5a is connected, by selecting an IP address for the wireless mobile device 5a according to the IP addresses assigned to the wireless server B3-2 and the wireless station devices 4-2~5.

Accordingly, by providing IP addresses to the wireless station devices, and using integrated services digital network (ISDN) routers A, B for the communication between the wireless server B3-2 and the wireless station device 4-3, communications can be carried out regardless of how far apart the wireless server B3-2 is from the wireless station device 4-3, without changing the configuration shown in FIG. 12.

As explained above, by proving a wireless server as a home server for terminal devices, and providing terminal identifying mechanisms and terminal managing mechanisms to the wireless server so that terminal connection approval and IP address issuance can be performed by the home server, communications are possible even when the terminal device is located in managing districts other than the district managed by the home server.

Also, in the present system, an IP address request made from a terminal device to a wireless server, which is not the home server for the terminal device, is processed through its home server by way of the presently communicating wireless server, therefore, it is possible to contact other wireless servers without changing the settings of the IP address of the terminal device.

Also, the above manner of informing the host server only when packet transfer occurs from the wireless terminal unit provides an advantage of avoiding congestion of data traffic, because of the elimination of the necessity of informing all the host servers for each move of the terminal unit 5-1.

Also, IP addresses are allocated also to the wireless station devices so that the Internet protocol and ISDN routers can be used for communicating between the terminal devices and the wireless server, thereby enabling the communications to be maintained regardless of the separation distance between the wireless server and the wireless station devices, without having to alter the configuration of the system.

Embodiment 4

Next, the operating of broadcasting information to individual wireless terminal unit 5-1 will be explained in the following.

Figure 13:
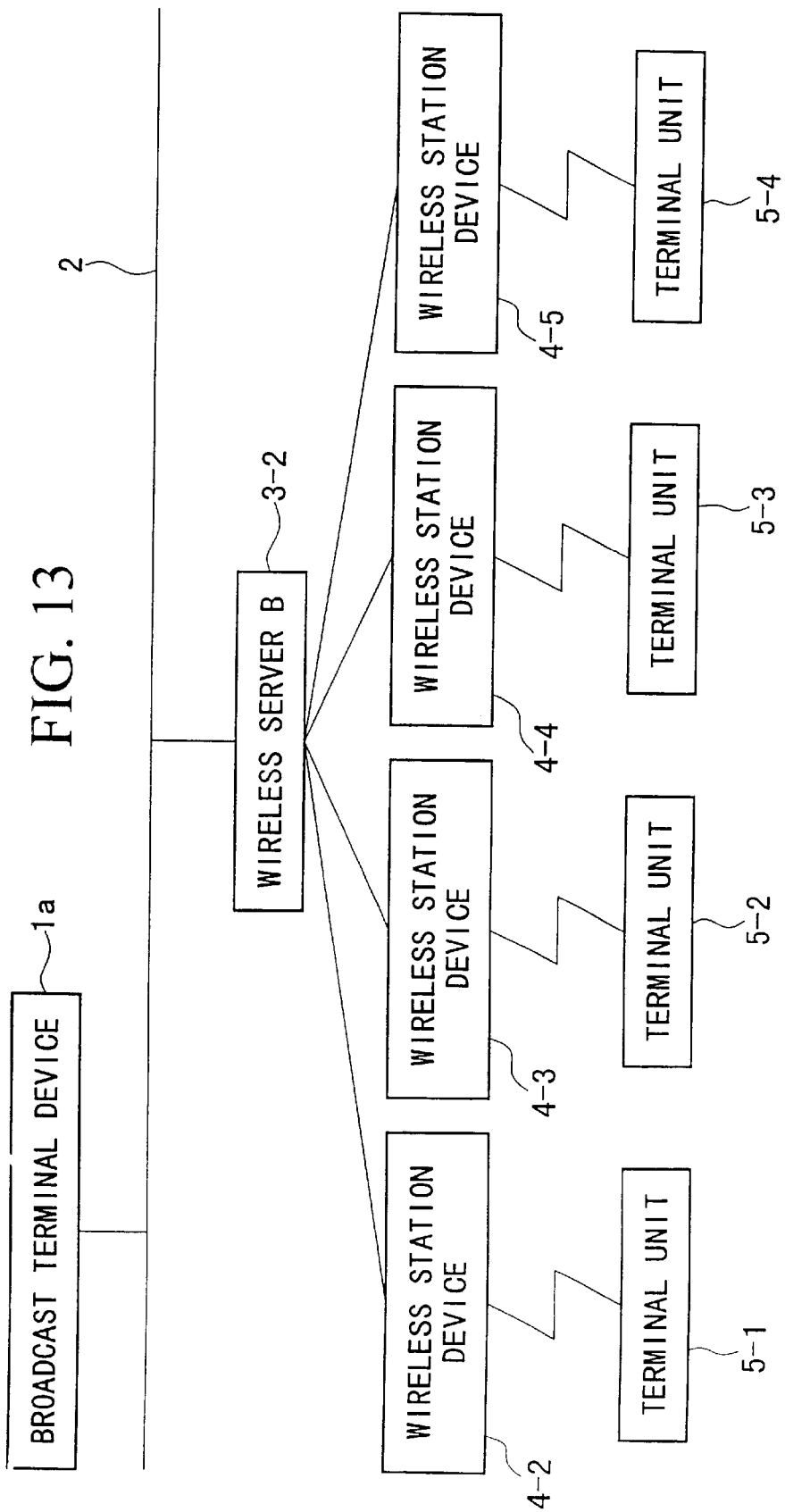
FIG. 13 is a block diagram of a structure of a network in Embodiment 4 of the present invention.

FIG. 13 shows a block diagram of the overall structure of the system including: a broadcasting terminal 1a for preparing and broadcasting information; a wireless server B3-2 connected to the terminal 1a by a network 2; four wireless station devices 4-2-5 connected to the wireless server B3-2; and individual terminal units 5-1-4 communicate with the respective wireless station devices 4-2-5.

It should be noted that although four wireless station devices 4-2-5 for the wireless server B3-2 are shown in the drawing, any number of devices may be connected as needed.

Also, while one terminal unit 5-1 is shown for each wireless station device 4-2, for example, each station device may communicate with more than two terminal unit 5-1.

Also, one the terminal unit 5-1 is shown for each wireless station device 4-2, for example, each station device may communicate with more than two terminal unit 501.

Next, a broadcasting operation from the broadcasting terminal 1a will be explained with reference to FIG. 13. The term "broadcasting" means distributing the same information to a plurality of terminal devices simultaneously.

First, the operator prepares information for broadcasting using the terminal 1a.

Figure 18:
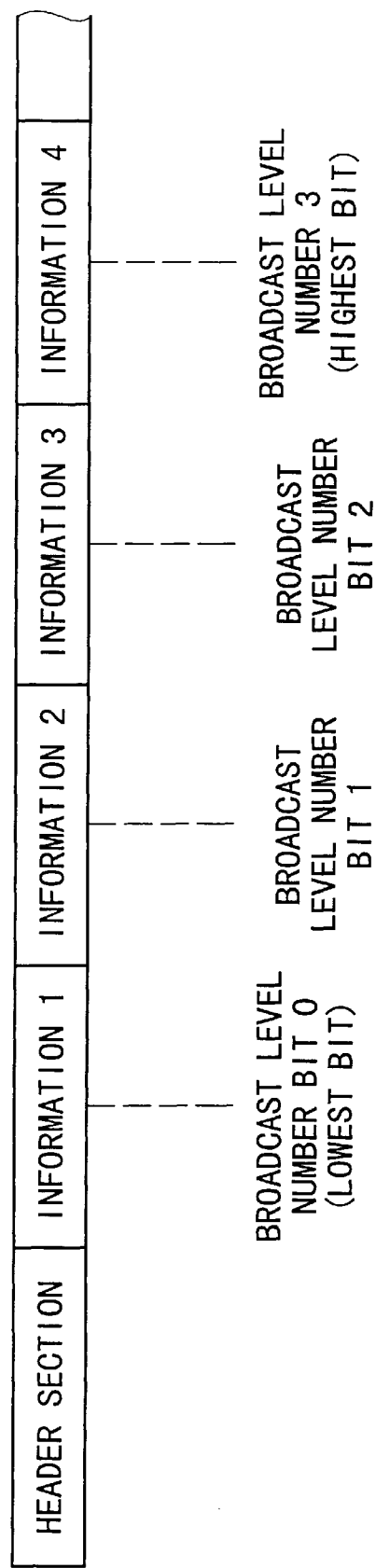
FIG. 18 is an illustration of a format of broadcast information.

An example of the broadcasting format is shown in FIG. 18. As shown in this illustration, broadcasting information includes a header section and a plurality of information sections. In this case, it is assumed that the information is divided into four sections.

In the header section are included, an identifier to indicate that the information i to be broadcast, network addresses for delivery of information, and sizes of the information files 1~4 that follow the header section.

It is rarely necessary that the same information is to all be broadcast to the terminal unit 5-1, so that the broadcast information is divided into a plurality of reception levels according to the subject matter. In the example shown in FIG. 18, the information is divided into four groups.

Dividing according to the reception levels can be explained using an example of broadcasting an emergency message according to the type of terminal devices as follows those belonging to individual persons (level 1), those belonging to self-governing bodies (level 3), those belonging to fire departments (level 7), and those belonging to police (level 15).

Accordingly, the terminals receiving broadcasting information is divided into prearranged reception levels, and are identified by the level numbers (referred to as broadcast levels).

In the example shown in FIG. 18, bits are assigned to information 1–4 to indicate the broadcast levels, so that when the bit is [1], the information is needed by the terminal having this level number. Information I is allocated to the lowest bit and information 4 is allocated to the highest bit.

For example, for those terminals requiring only information 1, only the lowest bit is [1] so that the level number is [1]. For those terminals requiring all the information 1–4, all four bits are [1] so that the level number is [15]. For those terminal requiring no information, level number is [0].

Accordingly, if there are four groups of information, there will be sixteen types of broadcast levels with level number ranging from [0] to [15].

Also, even when there is a large quantity of information to be broadcast, bit number can be increased to increase the number of levels.

Broadcast information is prepared by separating the information into a plurality of levels according to the broadcast levels.

Next, broadcasting terminal 1a broadcasts the prepared information to a specified network 2. The network to be broadcast is not limited to the network connected to the broadcasting terminal 1a, but can be selected by specifying other network addresses.

The broadcasting terminal may be constructed using a computer device having an input/output mechanism.

Next, the operation of the wireless server B3-2 for distributing the broadcast information to the terminal units 5-1-4 will be explained with reference to FIGS. 14, 16.

Figure 14:
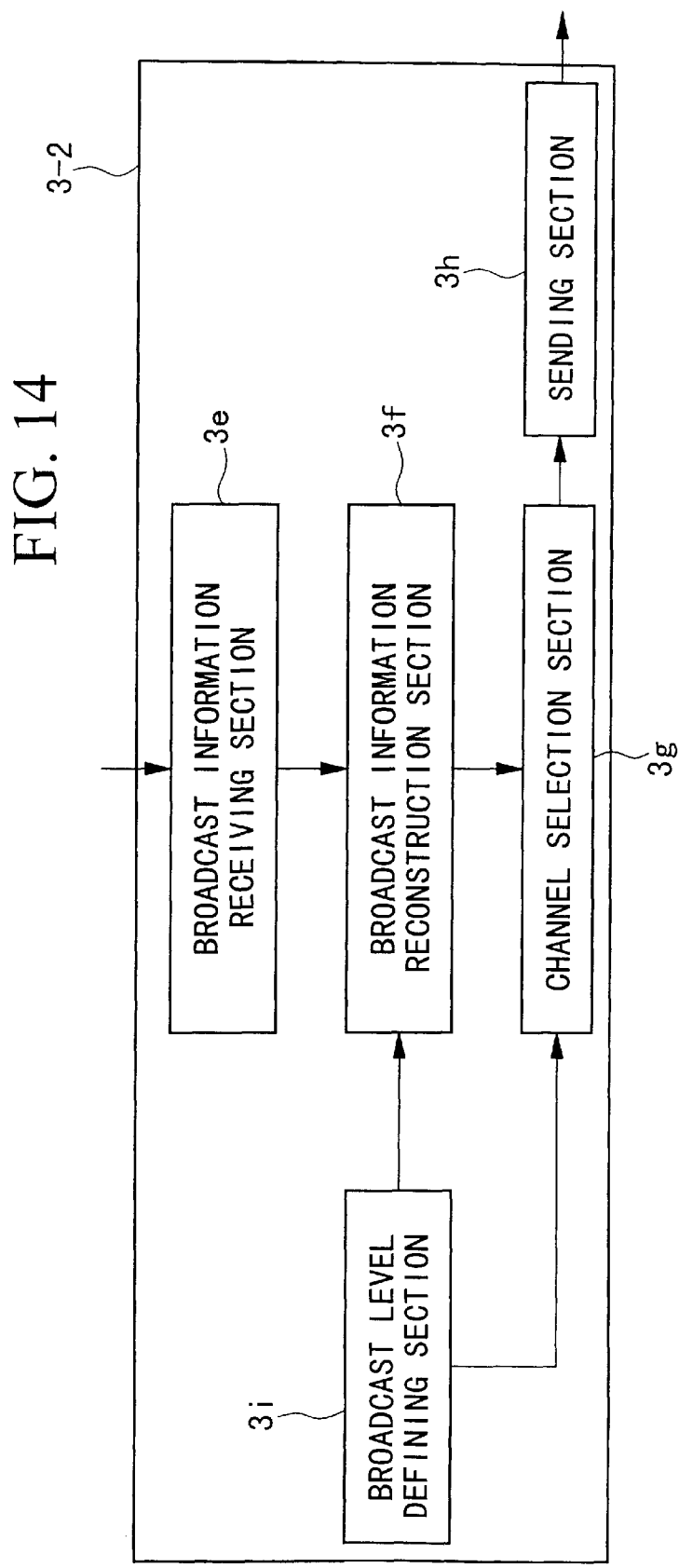
FIG. 14 is a block diagram of a structure of a wireless server B for performing simultaneous reporting in Embodiment 4.
Figure 16:
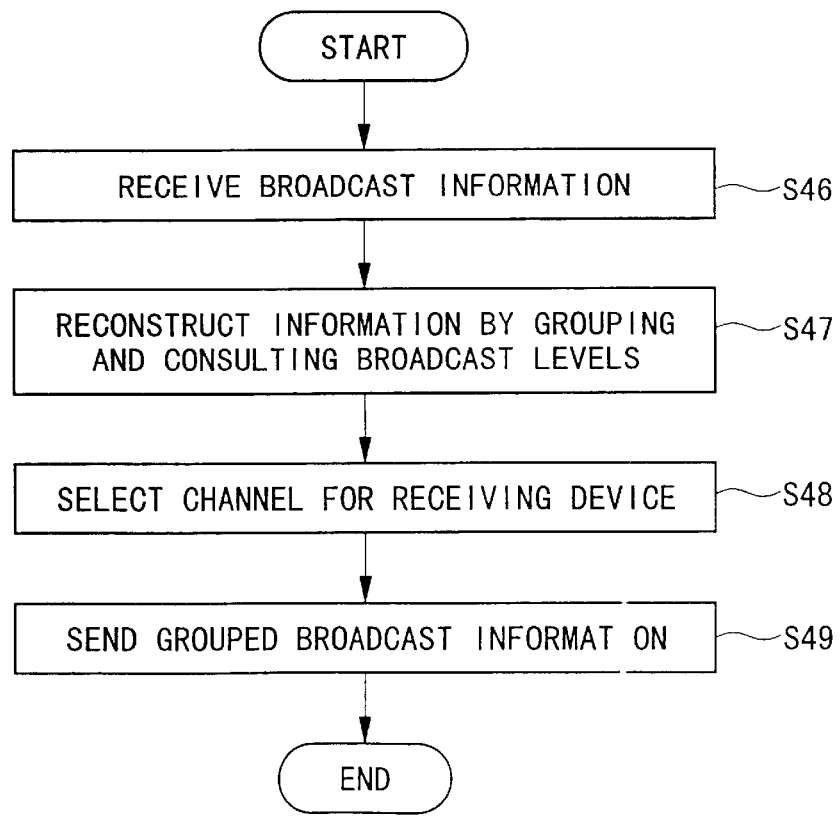
FIG. 16 is a flowchart for an operation of a wireless server B3-2 shown in FIG. 14.

FIG. 14 shows a block diagram of the structure of the wireless server B3-2, and FIG. 16 shows a flowchart of the steps taken by the wireless server B3-2.

First, a broadcast information receiving section 3e provided in the wireless server B3-2 receives broadcast information distributed by the broadcasting terminal 1a (step S46) and stores this information in a broadcast information receiving section 3e.

At this time, the broadcast information receiving section 3e judges whether or not this is broadcast information depending on whether or not the identifier is included in the header to indicate that it is broadcast information.

Then, the broadcast information reconstruction section 3f accesses the information stored in the broadcast information receiving section 3e, while consulting the broadcast level defining section 3l, and reconstructs broadcast information so as to match the broadcast levels of the connected the terminal units 5-1~4 (step S47).

Reconstruction of broadcast information means that the types of information not needed by the terminal unit 5-1 are eliminated so that the terminal units 5-1-4 may receive only the necessary information.

Also, in the broadcast level defining section 3i, there are defined the level numbers of the broadcast levels and communication channels of the terminal units 5-1~4 presently communicating with the wireless server B3-2.

Next, the channel selection section 3g refers to the broadcast level defining section 3i, and selects channels to correspond to the individual terminal units 5-1~4 (step S48) and forwards the reconstructed broadcast information to a sending section 3h.

Next, the sending section 3h transmits the broadcast information through a channel selected by the channel section 3g to the individual terminal units 5-1~4 (step S49).

In this case, if packet communication channels are already established between the wireless server B3-2 and the terminal units 5-1-4, the channel selection section 3g may transmit the packets by changing the receiver addresses to the addresses of the terminal unit 5-1.

Accordingly, because the wireless server B3-2 receives the grouped broadcast information, the wireless server B3-2 reconstructs broadcast information according to the broadcast levels of the terminal units 5-1~4, and transmits only the relevant information to the terminal units 5-1~4, so that the system can operate more efficiently.

Next, the process of selecting broadcast information by the terminal unit 5-1 will be explained with reference to FIGS. 13, 15 and 17.

Figure 15:
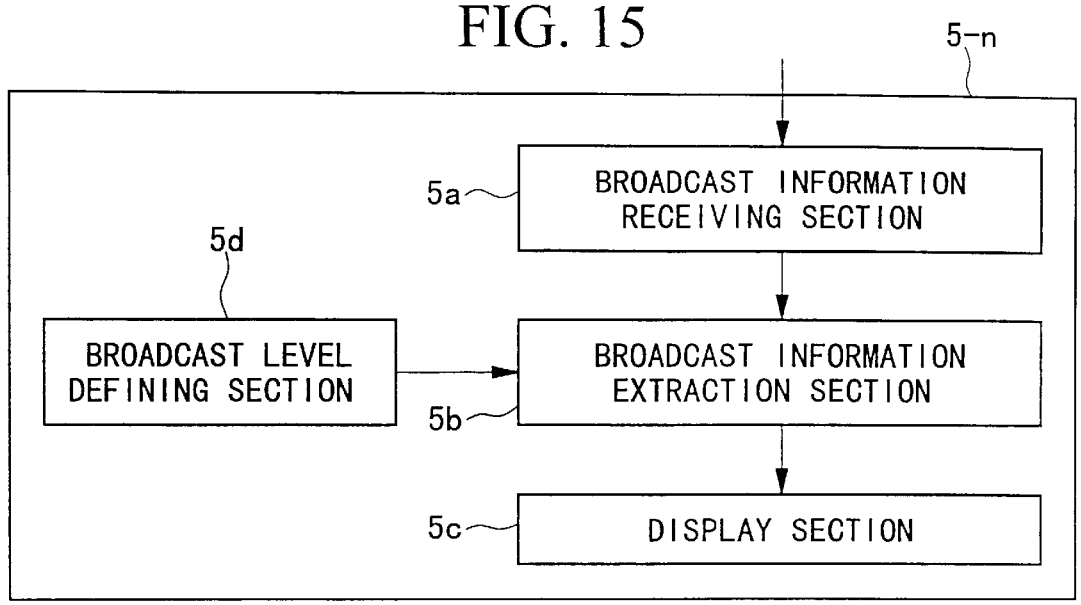
FIG. 15 is a block diagram of a structure of a terminal unit 5-1 for receiving broadcast information in Embodiment 4.
Figure 17:
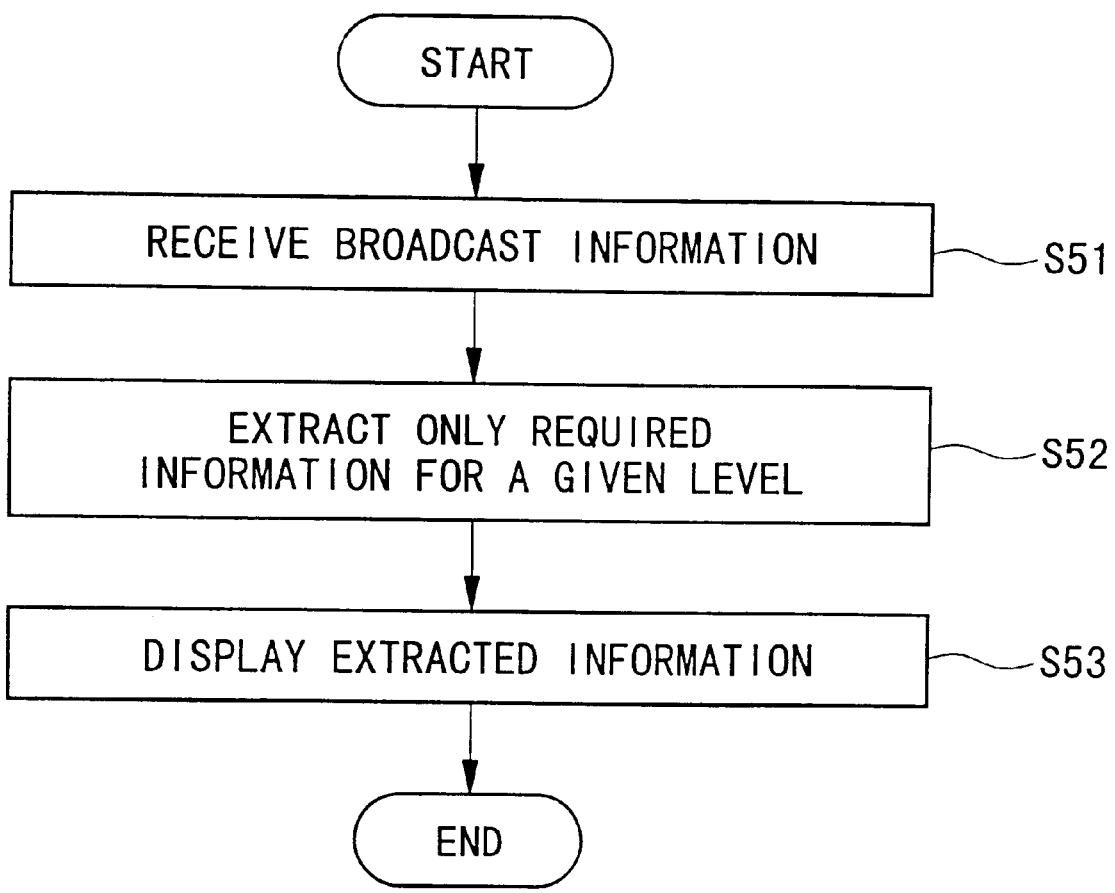
FIG. 17 is a flowchart for an operation of the terminal unit 5-1 shown in FIG. 15.

FIG. 15 shows a block diagram of the structure of the terminal unit 5-1, and FIG. 17 shows a flowchart of the steps taken by the terminal unit 5-1.

The operation of the terminal unit 5-1 will be explained with reference to FIGS. 15 and 17.

First, as described above, broadcast information is prepared by the broadcasting terminal 1a, and the information is broadcast within the network 2. Then, the wireless server B3-2 receiving the broadcast information distributes the information in the as received condition.

In the following explanation, because the operation is the same for all the terminal units 5-1~4, terminal unit 5-1 is chosen as the representative terminal.

When broadcast information is delivered from the wireless server B3-2, the receiving section (mobile device) 5a provided in the terminal unit 5-1 receives this information (step S51), and holds it in the receiving section 5a.

At this time, the receiving section 5a recognizes whether or not the information is broadcast information according to whether or not the broadcast identifier is included in the header section.

Next, the information extraction section 5b accesses the broadcast information stored in the receiving section 5a, while consulting the broadcast level defining section 5d, and extracts only the necessary information for the terminal unit 5-1 (step S52).

At this time, because the broadcast level of the terminal unit 5-1 is defined in the broadcast level defining section 5d shown in FIG. 15, only the necessary information is extracted from the broadcast information.

Next, the information extraction section 5b displays the extracted information on a display section 5c (step S53).

Accordingly, only the necessary information for the terminal unit 5-1 is displayed on the display section 5c provided on the terminal unit 5-1.

As described above, only the information required by the terminal unit 5-1 is extracted from the broadcast information so that the information processing efficiency is improved.

Also, because the process of information classification is carried out according to the broadcast level provided in the terminal unit 5-1, the broadcasting terminal can select what information to be delivered to a terminal unit 5-1, thus improving the information delivery efficiency.

It should be noted that although the system operation is exemplified by the use of wireless communication, terminal devices communicating with the wireless server B3-2 may include wired devices. Also, the terminal configuration shown in FIG. 15 can be applied to wired devices.

It should be noted also that the terminal unit 5-1 shown in FIG. 12 may communicate directly with a network 2.

It should also be noted that broadcast information is not limited to text data, other types of data such as audio data and customized signals are also applicable. In such cases, the display section 5c shown in FIG. 15 may be replaced with a speaker device for generating sounds, or an alarm device for generating an alarm sound in response to customized signals.

Embodiment 5

Embodiment 5, relating to a multi-cast system in which same information is distributed to a plurality of terminal unit 5-1, will be explained with reference to FIGS. 1, 13, 19 and 20. In contrast to a broadcasting which transmits the same information simultaneously to all the terminal unit 5-1, transmits the same information simultaneously to specific units.

Figure 19:
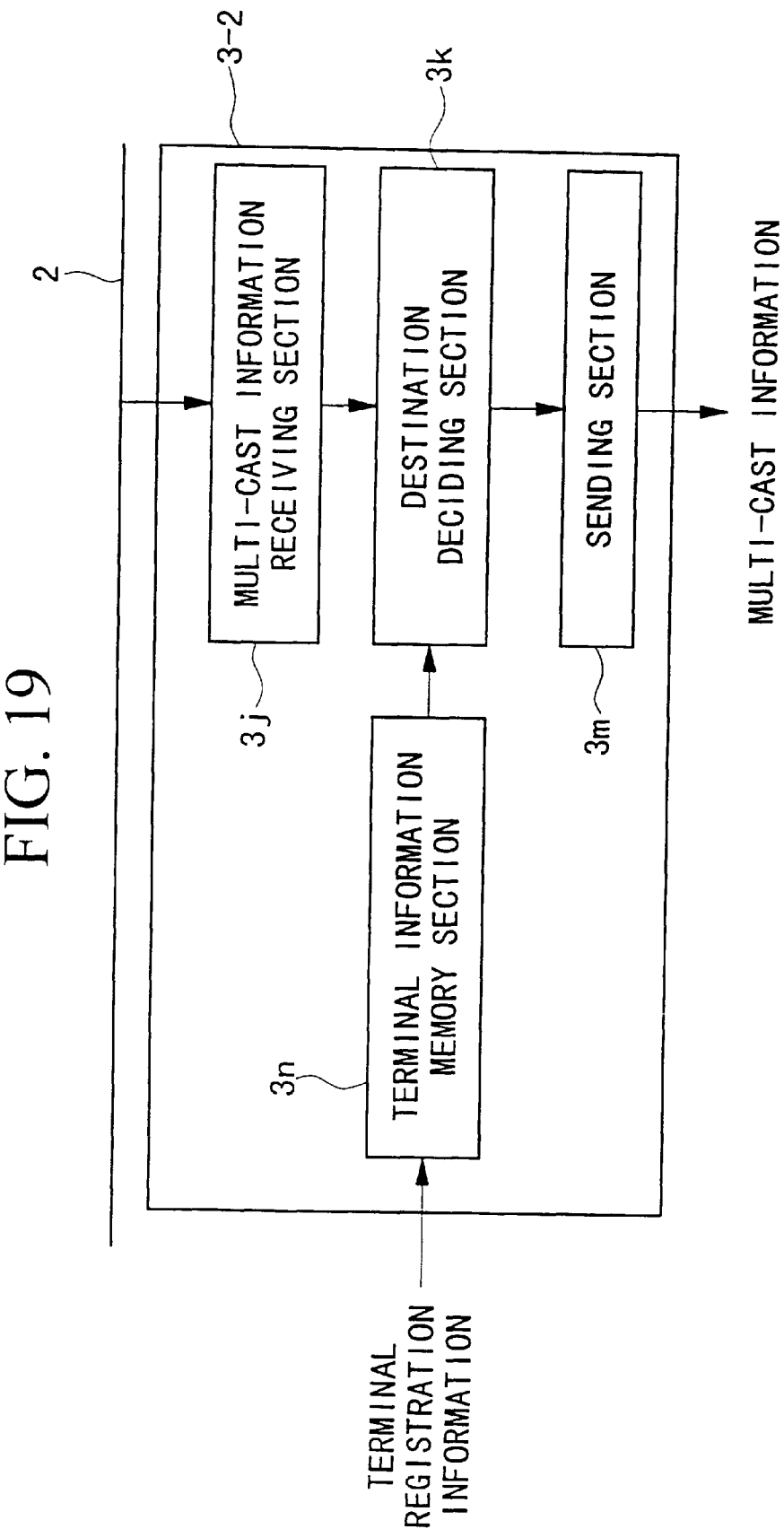
FIG. 19 is a block diagram of a structure of a wireless server B3-2 for performing multi-casting in Embodiment 5 of the present invention.

FIG. 19 shows a block diagram of the structure of the wireless server B3-2, which includes: a multi-cast information receiving section 3j which received information through a network 2; a destination deciding section 3k for determining the delivery destinations; a sending section 3m for sending received information to the terminal unit 5-1; and a terminal information memory section 3n for storing information on home server of the terminal unit 5-1 and a wireless server presently being connected.

Figure 20:
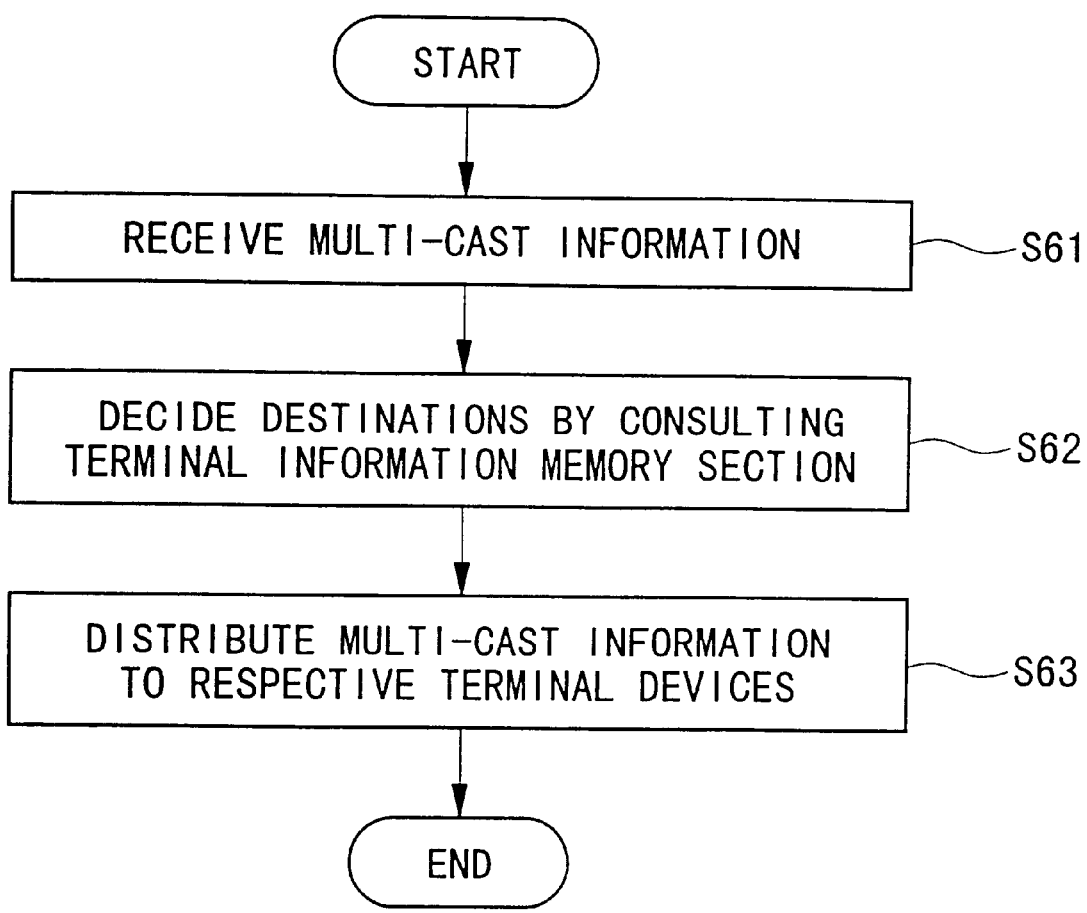
FIG. 20 is a flowchart for an operation of the wireless server B3-2 shown in FIG. 19.

FIG. 20 shows a flowchart of the steps of distributing multi-cast information to the terminal unit 5-1.

It is assumed that the terminal unit 5-1 to communicate with the wireless server A3-1, wireless server B3-2, the wireless server C3-3 shown in FIG. 1 have been classified into groups for receiving multi-cast information, and are provided with group identifiers ID. The group IDs are managed by the home servers for each of the terminal units 5-n, a client table containing terminal IDs and group IDs for the terminal unit 5-n is included in the terminal information memory section 3n of each home server.

First, the terminal unit 5-1 transmits a terminal registration request to the wireless server B3-2. At this time, the terminal unit 5-1 transmits its terminal ID. In response, the wireless server B3-2 carries out the terminal registration process as described earlier. Then, the wireless server B3-2 reports particulars of the terminal unit 5-1 to the home server (in this case wireless server C3-3), which registers this information. By this process, the home server (wireless server C3-3) is able to obtain an identification of the wireless server presently communicating with the terminal unit 5-1 that is requesting a terminal registration, and the group ID of the terminal unit 5-1.

Next, when the registration process is completed, the home server reports to the wireless server B3-2 the group ID of the terminal unit 5-1 registered presently. Upon receiving the group ID, the wireless server B3-2 registers the group ID in the terminal information memory section 3n.

Accordingly, this process results in the terminal information memory section 3n in the wireless server B3-2 to store a plurality of group IDs for those terminal units 5-n whose home server is the wireless server B3-2 as well as those terminal unit 5-n whose home servers are other wireless servers located in other terminal managing districts.

Next, the operation, of the wireless server B3-2 to receive a multi-cast packet from a terminal unit, 5-1 and multi-casts the packet to specified terminal unit 5-1, will be explained in the following.

First, a terminal unit 5-n prepares multi-cast packet. The packet contains an identifier to indicate that the information is to be multi-cast, and address of the destination network and group ID for information distribution. The packet is then transmitted to the destination network. It should be noted that the terminal unit 5-n preparing multi-cast information can be connected to any network and the information can be delivered to any destination network.

Next, the information receiving section 3j provided in the wireless server B3-2 receives multi-cast information (step S61). At this time, the information receiving section 3j judges whether or not the information is multi-cast information on the basis of whether or not the identifier ID indicating multi-casting is included in the header. The received multi-cast information is stored in the information receiving section 3j.

Next, destination deciding section 3k accesses the multi-cast information stored in the information receiving section 3j, while consulting the contents of the memory of the terminal information memory section 3n, to decide the delivery destination (step S62). At this time, the destination deciding section 3k selects terminal units for packet delivery, by extracting the group ID contained in the multi-cast information, and extracting those terminal units having the same group ID by referring to the content of the terminal information memory section 3n. Packet delivery is made to those terminals that are presently communicating with the wireless server B3-2 if they have the same group ID. If they are not presently communicating, delivery is made later, once they are communicating.

On the other hand, if a terminal unit 5-1 whose home server is the wireless server B3-2 is presently communicating with another wireless server and has the same group ID for multi-casting delivery, the destination deciding section 3k deduces the wireless server which is presently communicating with the terminal unit 5-1, and designates this wireless server to be a packet delivery destination.

Next, when the delivery destination has been decided, the destination deciding section 3k transmits multi-cast information received in the information receiving section 3j to individual terminal units 5-n through the sending section 3m (step S63).

Accordingly, the features of this system are that the reference is made to the terminal information memory section 3n to decide the terminal units for receiving multi-cast information, and that the reliability of information delivery is assured because multi-cast information can be transferred to the correct destination, even when the terminal unit 5-1 is connected to another wireless server.

It should be noted that the processes described in flow-charts shown in FIGS. 3, 4, 5, 6, 11, 16, 19 and 20 can be carried out by application programs recorded on a computer readable memory medium, and executing the program by a computer system. Computer system, in this context, includes any operating systems and peripheral hardwares that are connected (remotely or directly) to networks. Computer-readable recording media include portable media such as floppy discs, opto-magnetic discs, ROM, CD-ROM, as well as fixed devices such as hard discs housed in computer systems.

Computer-readable recording media include short-term dynamic memories used in transmitting programs and data through communication circuits such as Internet or telephone circuits, as well as other short-term memories such as volatile memories used in servers and client computer systems. Application program may perform a part of the described functions, or may be operated in conjunction with pre-recorded programs stored in computer systems.

In other words, a computer-readable recording medium containing a relay agent program for processing an IP address request should include functions so that the computer can execute tasks such as: processing an IP address request from a wireless mobile device; deducing a home server of the requesting wireless mobile according to a request content; issuing an IP address request on behalf of the requesting wireless mobile device; receiving an IP address issued by the home server; and distributing the received IP address to the requesting wireless mobile device.

Also, a computer-readable recording medium containing a terminal connection program for processing a terminal connection request should include approval functions so that the computer can execute tasks such as: identifying a terminal in response to a terminal registration request; issuing an IP address that is presently available for use.

Also, the terminal connection program should further include packet transfer functions so that the computer can execute a task that, when a terminal device moves from a previously-connected wireless server to a presently communicating wireless server that is not its home server, and packet data addressed to the terminal device are delivered to the presently communicating wireless server that is not its home server, and the packet data are routed to the presently communicating wireless server according to the IP address obtained from the home server of the subject terminal device.

Also, the terminal connection program should further include routing functions so that the computer can execute a task that, when the subject terminal device is presently communicating with a wireless server that is not its home server and packet data are transferred to the wireless terminal, a host server on the Internet that routed the packet data is advised of the identity of the presently communicating wireless server so that subsequent packet data are routed to the presently communicating wireless server.

Also, a computer-readable recording medium containing a broadcasting program for distributing information should include broadcasting functions so that the computer can execute tasks such as: receiving distributed broadcast information; extracting from the received broadcast information only the necessary information for the subject terminal device, while consulting the contents of the broadcast level defining section; and displaying only the required information on a display section of the subject terminal device.

Also, a computer-readable recording medium containing a multi-cast program for distributing information should include multi-casting functions so that the computer can execute tasks such as: receiving multi-cast data; deciding distribution destinations for the multi-cast data by consulting terminal information; and distributing multi-cast data according to decided delivery destinations.

Furthermore, the present wireless server system enables a terminal unit to continue to communicate in different managing districts so that this technologies can be utilized in the field such as: messages (such as e-mail, netnews, file transfer protocol (FTP)), voice mail, web broadcasting, computer telephony integration (CTI), information broadcasting, telemetering, intelligent transport system (ITS). Also, the system is applicable to the push-technology when used in conjunction with routing functions.

Embodiment 6

The wireless station device 4-n and the terminal unit 5-1 shown in FIG. 1 will be explained with reference to FIGS. 21–24.

Figure 21:
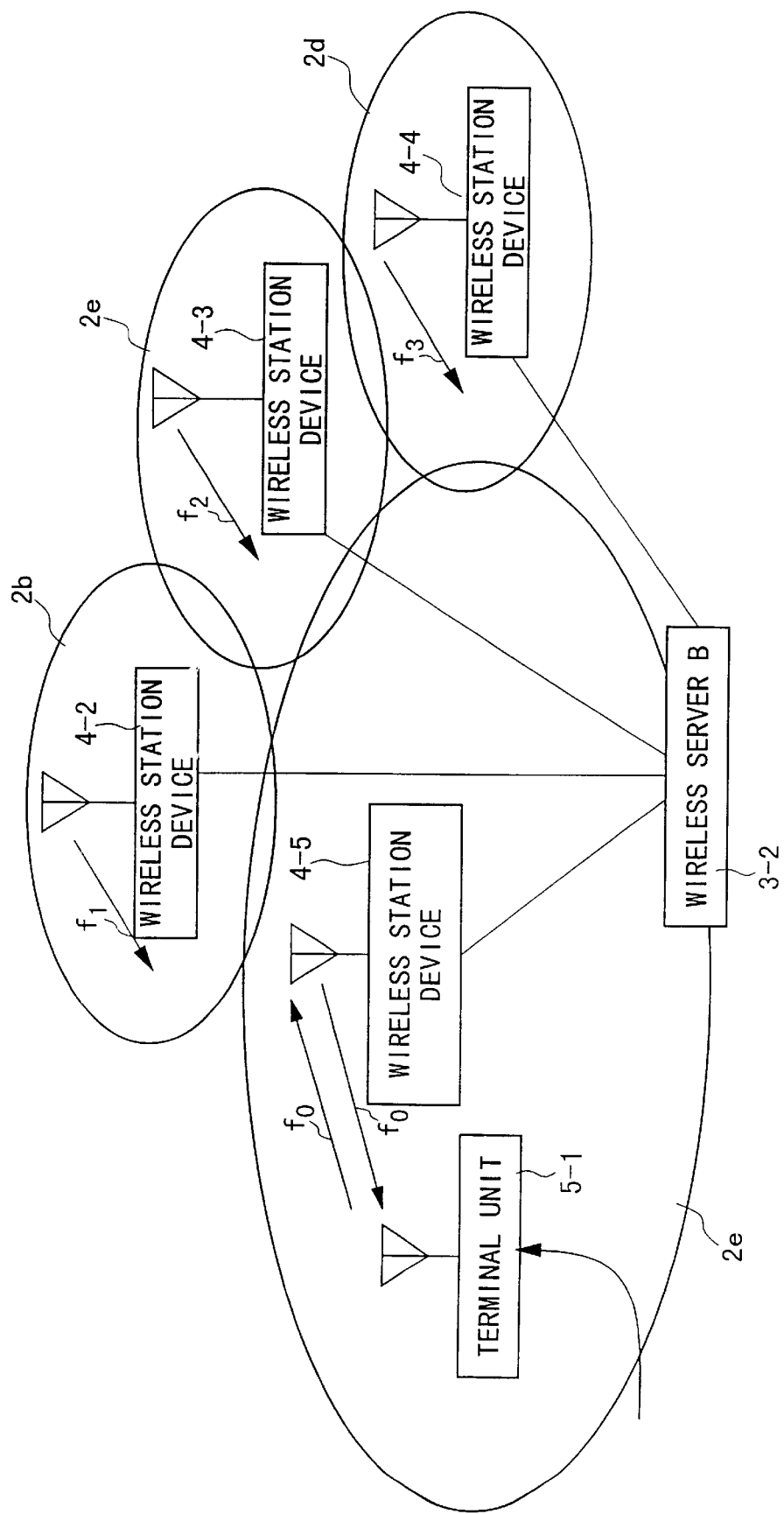
FIG. 21 is a block diagram of a structure of the wireless network in Embodiment 6 of the present invention.

FIG. 21 shows a block diagram of the overall configuration of the wireless server system which includes: a wireless server B3-2 a plurality of wireless station devices 4-2-5 wire-connected to the wireless server B3-2 using sending frequencies f1–f3; a terminal unit 5-1 for wireless communication with the wireless station device 4-5 which uses a sending frequency f0. The terminal unit 5-1 includes by a wireless mobile device 5a and a terminal device 5b and uses a sending frequency F0.

In the following explanation, the sending frequencies f0–f3 of the wireless station devices 4-2-5 are termed the "down-frequencies" and the sending frequency F0 of the wireless mobile device is termed the up-frequency.

Figure 22:
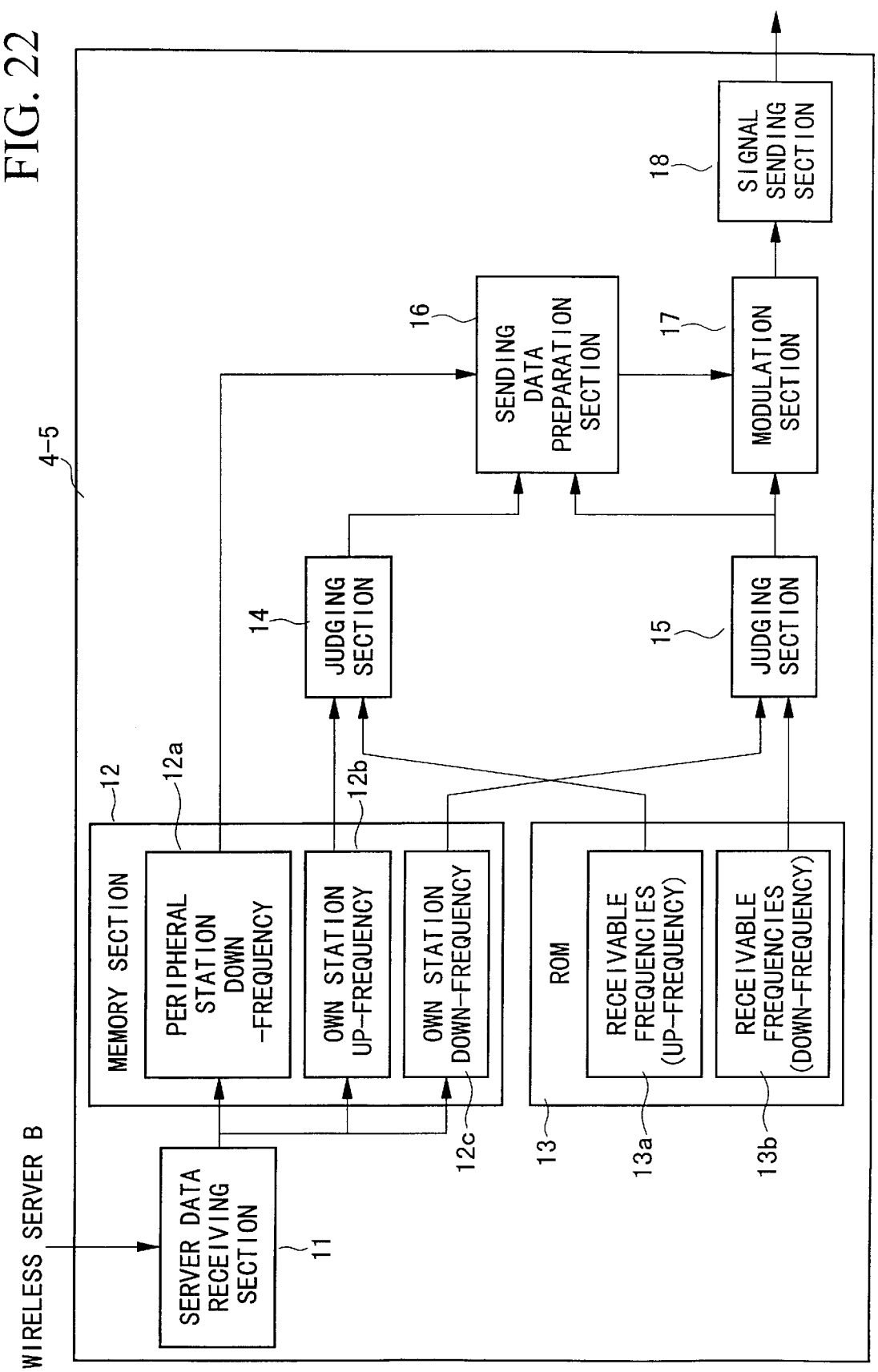
FIG. 22 is a block diagram of the structure of the wireless station devices 4-2~4-4.

FIG. 22 show a block diagram of the configuration of the wireless station devices 4-2-5, which includes by: a server data receiving section 11 for receiving data sent from the wireless server B; a memory section 12 for storing the data received in the server data receiving section 11; a ROM 13 for storing operational frequencies containing a plurality of values of up-frequency 13a and down-frequency 13b; judging sections 14, 15 for comparing data sent from wireless server B with data stored in ROM of a wireless station device 4-n, and output results of comparison; a sending data preparation section 17 for receiving results of the judging sections 14, 15 and preparing sending data to be sent from the station device 4-n; a modulation section 17 for modulating the data; and a signal output section 18 for sending the modulated data produced by the modulation section 17.

Figure 23:
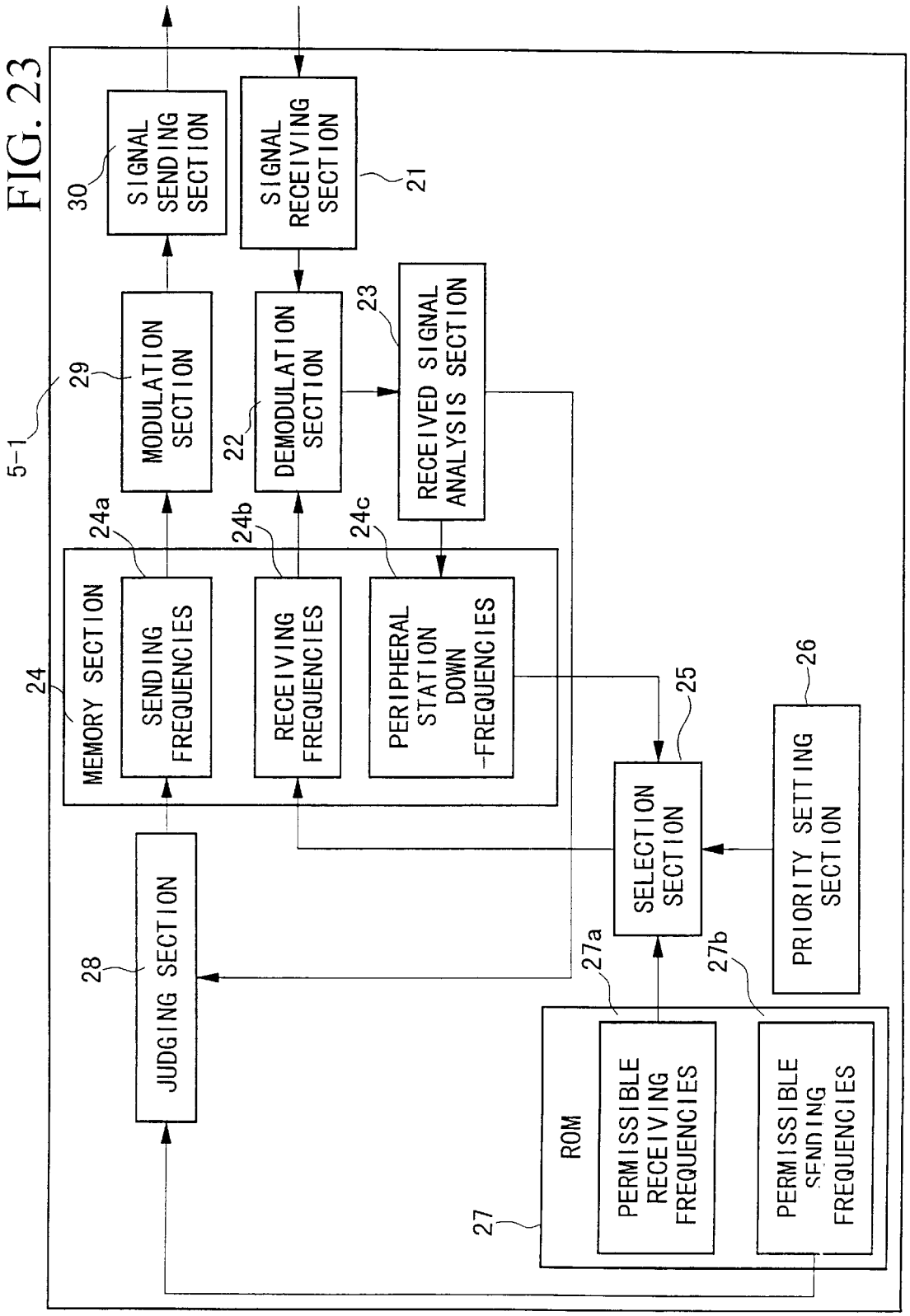
FIG. 23 is a block diagram of the structure of the terminal unit 5-1.

FIG. 23 shows a block diagram of the configuration of the terminal unit 5-1 shown in FIG. 21 which includes: a signal receiving section 21 for receiving signals sent from the wireless station device 4-n; a demodulator 22 for demodulating the received data, a received signal analysis section 23; a memory section 24 for storing the operational frequencies; a frequency selection section 25 for selecting receiving frequency; a priority setting section 26 for selecting the order of receiving frequencies by the frequency selection section; a ROM 27 for storing frequencies that can be received by the terminal unit 5-1; and judging section 28 for judging the sending frequency that can be used by the terminal unit 5-1.

The operation of the wireless server B3-2, wireless station devices 4-2-5, and the terminal unit 5-1 will be explained with reference to the drawings. In this case, wireless station device 4-5 is used as an example.

First, the wireless server B3-2, managing the wireless station devices 4-2-5, informs each of the wireless station devices 4-2-5 what operational frequency can be used. At this time, the wireless server B3-2 transmits the same information to all the wireless station devices 4-2-5, thereby enabling the wireless station devices 4-2-5 to know the operational frequencies of the other wireless station devices.

Next, the operation of the wireless station devices 4-5 will be explained.

The server data receiving section 11 provided in the wireless station device 4-5 receives the down-frequency information sent by the wireless server B3-2. Then, the server data receiving section 11 stores the received information in the memory section 12. Then, the server data receiving section 11 stores data received by the peripheral wireless station devices (in this case, wireless station devices 4-2-4) separately as up-frequency 12a for peripheral wireless station devices, up-frequency 12b and down-frequency 12c for own device.

Next, the judging section 14 compares up-frequency 13a stored in ROM 13 with own up-frequency 12b stored in the memory section 12. If the result shows that the own up-frequency 12b sent from the wireless server B3-2 is a permissible frequency, this up-frequency 12b is forwarded to the sending data preparation section 16.

In parallel with the above process, the judging section 15 compares down-frequency 13b stored in ROM 13 with the own down-frequency stored in the memory section 12. If the result shows that the own down-frequency 12c sent from the wireless server B3-2 is a permissible frequency, the down-frequency 12c is forwarded to the sending data preparation section 16 and the modulation section 17.

Next, the sending data preparation section 16 converts up- and down-frequency information received from the judging sections 14, 15 to sending data. Concurrently, the sending data preparation section 16 converts information regarding the down-frequencies 12a for the peripheral wireless station devices to sending data. Then, the sending data preparation section 16 forwards the converted sending data to the modulation section 17.

Next, the modulation section 17 uses the down-frequency received from the judging section 15 to modulate the sending data prepared by the sending data preparation section 16. The modulated sending data are sent from the signal sending section 18.

Figure 24:
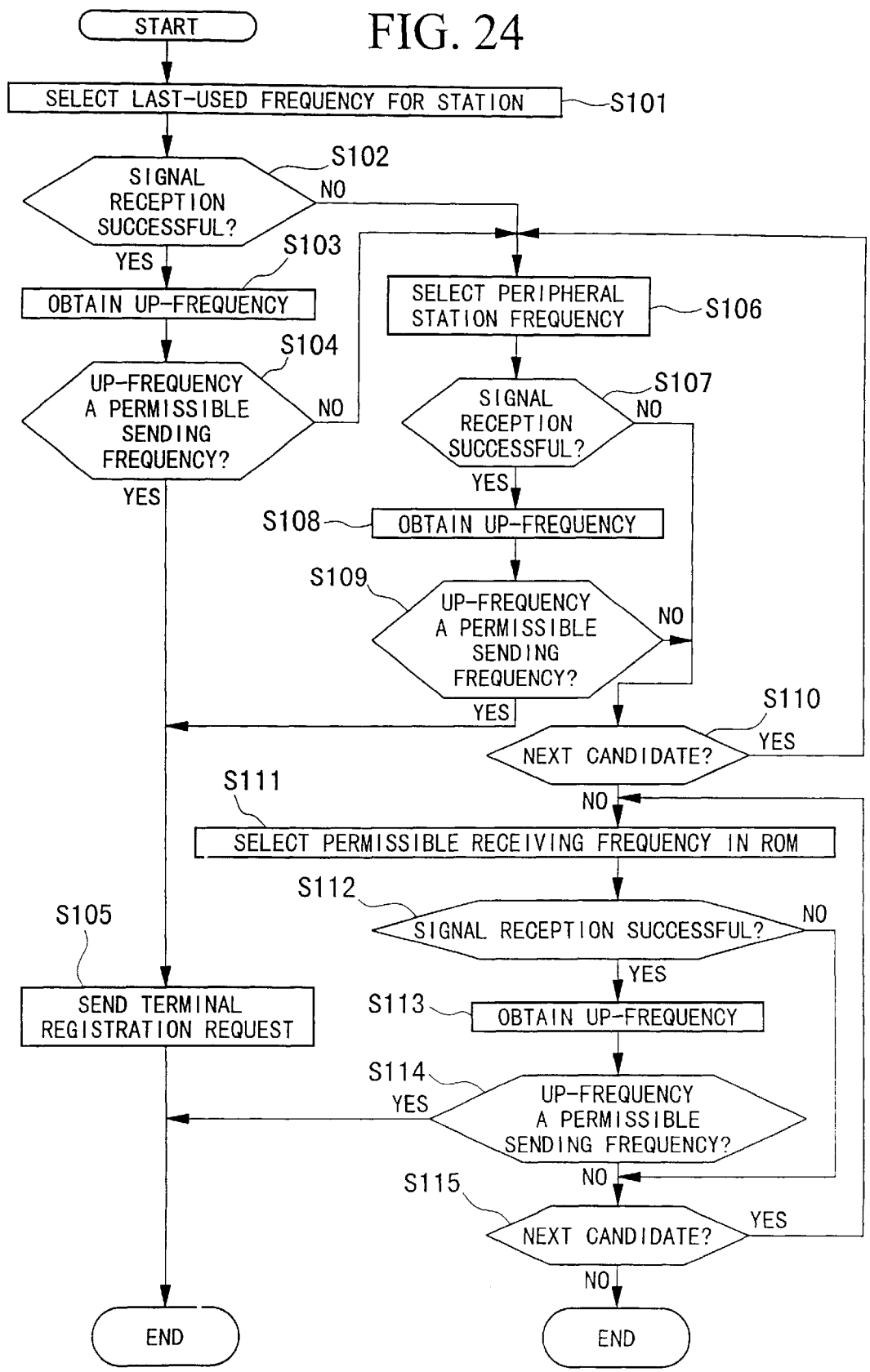
FIG. 24 is a flowchart for the operation of the terminal unit 5-1 shown in FIG. 21.

Next, the operation of the terminal unit 5-1 will be explained. FIG. 24 shows a flowchart of the steps taken by the terminal unit 5-1.

First, the demodulation section 22 uses a receiving frequency 24b stored in the memory section 24 to attempt to receive signals from the signal receiving section 21 (step S101). This receiving frequency 24b is the frequency which was last-used for communication.

Next, it is examined whether the signal reception by the demodulator 22 was successful (step S102), and if successful, the received signal is demodulated and is forwarded to the received signal analysis section 23.

Next, the received signal analysis section 23 analyzes the received signal, and stores the down-frequency of the peripheral wireless station device in the memory section 24 and obtains up-frequency (step S103) which is forwarded to the judging section 28.

Next, the judging section 28 accesses the permissible seeding frequencies 27b stored in ROM 27, and compares with the up-frequency received from the received signal analysis section 13, and checks whether the up-frequency received is permissible for signal transmission (step S104). This judgment is based on whether the received up-frequency matches the sending frequencies 27b stored in ROM 27. If the result indicates that it can be sent, the judging section 28 stores the up-frequency in the memory section 24. Then, the modulation section 29 uses the sending frequency 24a stored in the memory section 24 to send the registration request from the terminal unit 5-1 (step S105). Also, when there is no need for sending the terminal registration, it is possible to eliminate the step of sending the request.

The registration request is sent by having the modulation section 29 access the sending frequency stored in the memory section 24, and sending the signal from the signal sending section 30 at this frequency.

Accordingly, when the mobile wireless terminal has not moved, the use of the last used frequency to obtain the up-frequency enables to commence communication without performing the frequency selection step.

On the other hand, if signal reception is not possible in step S102 and if the up-frequency is not a permissible frequency in step S104, the selection section 25 checks the down-frequencies 24c of the peripheral wireless station device stored in the memory 24, and selects a receiving frequency according to the priority order stored in the priority setting section 26 (step S106). At this time, the selection section 25 compares the selected receiving frequency with the permissible receiving frequencies stored in the memory 27, and if the selected receiving frequency is a permissible frequency, this frequency is stored in the memory section 24.

Next, the demodulation section 22 uses the receiving frequency 24b stored in the memory section 24 to check whether the signal reception was successful (step S107), and if it was successful, received signal is demodulated which is forwarded to the received signal analysis section 23.

Next, the received signal analysis section 23 analyzes the received signal, and stores peripheral down-frequency in the memory section 24, and concurrently, obtains the up-frequency (step S108) which is forwarded to the judging section 28.

Next, the judging section 28 accesses the permissible sending frequencies 27b stored in ROM 27, and compares them with the up-frequency received from the received signal analysis section 23, and checks whether the up-frequency received is permissible for signal sending (step S109). This judgment is based on whether the received up-frequency matches the sending frequencies 27b stored in ROM 27. If the result indicates that it can be sent, the judging section 28 stores the up-frequency in the memory section 24. Then, the modulation section 29 uses the sending frequency 24a stored in the memory section 24 to send the registration request from the terminal unit 5-1 (step S105). Also, when there is no need for sending the terminal registration, it is possible to eliminate the step of sending the request.

Next, if signal reception was not possible in step S107 and if the up-frequency is not the permissible frequency in step S109, steps S106–S109 are repeated (step S110).

Next, in step S110, if there are no other candidates for the permissible down frequencies, the selection section 25 checks the permissible receiving frequencies 27a stored in ROM 27, and selects a receiving frequency according to the priority order stored in the priority order setting section 26 (step S111), which is stored in the memory section 24.

Next, the demodulation section 22 uses the receiving frequency 24b stored in the memory section 24 to check whether the signal reception was successful (step S112), and if it was successful, received signal is demodulated which is forwarded to the received signal analysis section 23.

Next, the received signal analysis section 23 analyzes the received signal, and stores peripheral down-frequency in the memory section 24, and concurrently, obtains the up-frequency (step S113) which is forwarded to the judging section 28.

Next, the judging section 28 accesses the permissible sending frequencies 27b stored in ROM 27, and compares them with the up-frequency received from the received signal analysis section 23, and checks whether the up-frequency received is permissible for signal sending (step S114). This judgment is based on whether the received up-frequency matches the sending frequencies 27b stored in ROM 27. If the result indicates that it can be sent, the judging section 28 stores the up-frequency in the memory section 24. Then, the modulation section 29 uses the sending frequency 24a stored in the memory section 24 to send the registration request from the terminal unit 5-1 (step S105). Also, when there is no need for sending the terminal registration, it is possible to eliminate the step of sending the request.

Next, if signal reception was not possible in step S112 or if the up-frequency is not the permissible frequency in step S114, steps S114 are repeated (step S115). Next, in step S115, if there are no other permissible receiving frequencies, the terminal unit 5-1 is not able to use the present managing district so that it is necessary to move to another managing district, and attempt the steps shown in FIG. 24.

When the wireless station device 4-5 shown in FIG. 21 has commenced communicating other terminal unit, the terminal unit 5-1 is in a standby state. In this condition, if the terminal unit 5-1 tries to send a packet to the wireless server B3-2, the wireless station device 4-5 cannot be accessed. In such a case, the terminal unit 5-1, using a receiving frequency of a peripheral station device (wireless station device 4-2-4, in this case) obtained in step S101 (FIG. 24) and stored in the memory section 24, acquires a sending frequency of the wireless station device 4-4-2 by following the steps S106–S109. This approach permits the terminal unit 5-1 to communicate immediately with the wireless station device 4-4-2 without changing the wireless server B3-2, thus eliminating the necessity for the step of terminal registration (FIG. 24).

Further, if the step S106–S109 are carried out while the terminal unit 5-1 is in the standby state, a packet can be sent out immediately without having to receive a new sending frequency of the wireless station device 4-2.

It is assumed that the contents of the memory section 24 shown in FIG. 23 remains intact in the last-used condition prior to turning off the terminal unit 5-1.

Embodiment 7

The structure of the terminal unit 5-1 and its operation in Embodiment 7 will be explained in the following.

Figure 25:
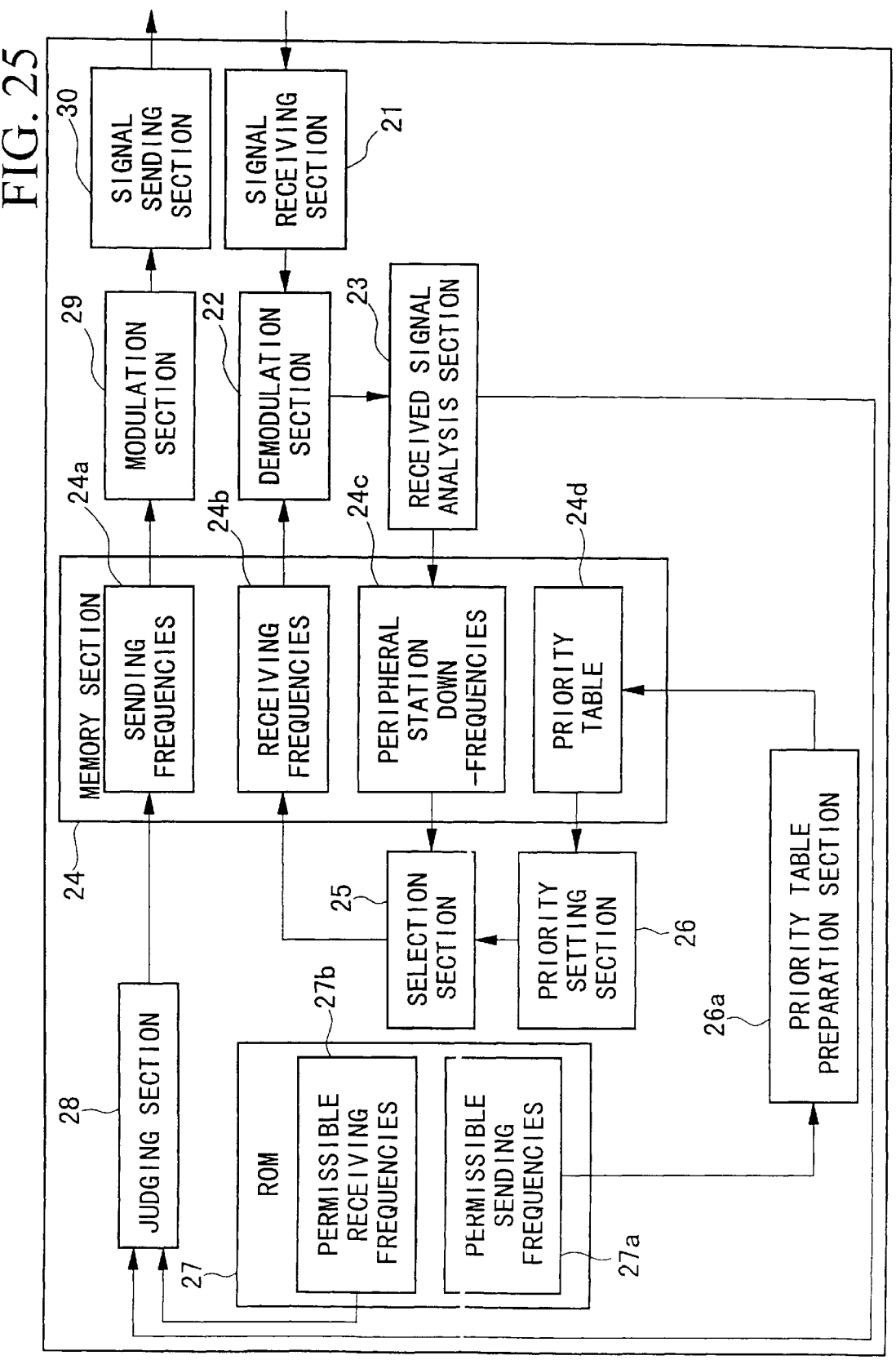
FIG. 25 is a block diagram of the structure of a terminal unit 5-1 in Embodiment 7 of the present invention.

FIG. 25 shows a block diagram of the configuration of the terminal unit 5-1. The differences of the this configuration and that shown in FIG. 23 are that a priority table 24d is provided in the memory section 24 and that a priority table generation section 26a, for generating a priority table 24d, is provided on the basis of permissible receiving frequencies 27a residing in ROM 27.

FIG. 26 shows an example of the structure of the table containing the permissible receiving frequencies 27a stored in ROM 27 shown in FIG. 25. As shown in this table, permissible receiving frequencies 27a are arranged in two tables. Possible channel table shown in FIG. 26A includes a district name field and a channel number field. The district name is used to distinguish the districts in which the wireless server B3-2 and the wireless station devices 4-2-5 are operating, so that for one wireless server B3-2, there is a managing district name. In this example, it is assumed that there are four wireless station devices 4-2-5 and it is assumed that they are designated by respective district names [a], [b], [c], [d]. Channel numbers define channels that can be used in each district, and in the district [a] for example, channel numbers 1, 2, 3, 4, 5 and 6 are operable.

Also, the frequency table shown in FIG. 26B includes the channel number field and the permissible receiving frequency field. The channel numbers are logical numbers allocated to each permissible receiving frequencies, and it is assumed, in this case, that the terminal unit 5-1 are able to use permissible receiving frequencies f1~f12 corresponding to channel numbers 1~12.

FIG. 27 shows the structure of the priority table 24d stored in the memory section 24. As shown in this diagram, the priority table 24d includes a channel number field, a district name field, a number of districts field, a permissible receiving frequency field. The district names relate to those districts using the frequencies of the assigned channel numbers. The number of districts relates to the number of district using the frequencies of the assigned channel numbers. For example, in FIG. 27, channel number 1 are used in districts a, b, c, so that the number of district is three.

Next, the operation of the terminal unit 5-1 will be explained with reference to the drawings.

First, when the power is turned on for the terminal unit 5-1, the priority table generation section 26a generates a priority table 24d in the memory section 24 by consulting the permissible receiving frequencies 27a stored in ROM 27. The process of generating the priority table 24d will be explained in the following.

First, the priority table generation section 26a accesses the permissible receiving frequency table (refer to FIG. 26B) of the permissible receiving frequencies 27a stored in ROM 27, and enters the values in the respective fields in the priority table 24d. At this point, the channels numbers and permissible receiving frequencies become listed in respective fields of the priority table 24d, as shown in FIG. 28.

Next, the priority table generation section 26a accesses the permissible frequency table (FIG. 26A) of the permissible receiving frequencies 27a stored in ROM 27, and enters the values in the respective fields in the priority table 24d. At this time, the priority table generation section 26a extracts district names using the channel numbers and enters the values in the district name field. In the example shown in FIG. 26, channel number [1] is operating in district names [a], [b] and [c], therefore, [a], [b], [c] are entered in the district name field corresponding to channel 1 in the priority table 24d.

By repeating this step, the district names using channel numbers [1]–[12] are entered in the district name field. When the data entry process is completed, the priority table generation section 26a counts the number of districts using each channel number and the results are entered in the number of district field. At this point, for each channel number, the district names using the channel number and the number of districts using each channel number become listed in the priority table 24d.

Next, the priority table generation section 26a rearranges the data using the number of districts as the sort key so that the table shows a descending order of channel usage, listing the most frequently used channels at the top, thereby preparing the priority order table 24d shown in FIG. 27.

By following the steps described above, the priority table 24d shown in FIG. 27 is prepared from the data in the permissible receiving frequency table and the permissible channel table giving the permissible receiving frequencies 27a shown in FIG. 26.

Next, the operation of the terminal unit 5-1 shown in FIG. 25 will be explained with reference to FIG. 29. The difference between the flowcharts shown in FIGS. 29 and 24 is that the step of selecting a permissible receiving frequency stored in ROM (step S111) is replaced with the step of selecting a permissible receiving frequency in the priority table (step S111b) stored in the memory section.

Figure 29:
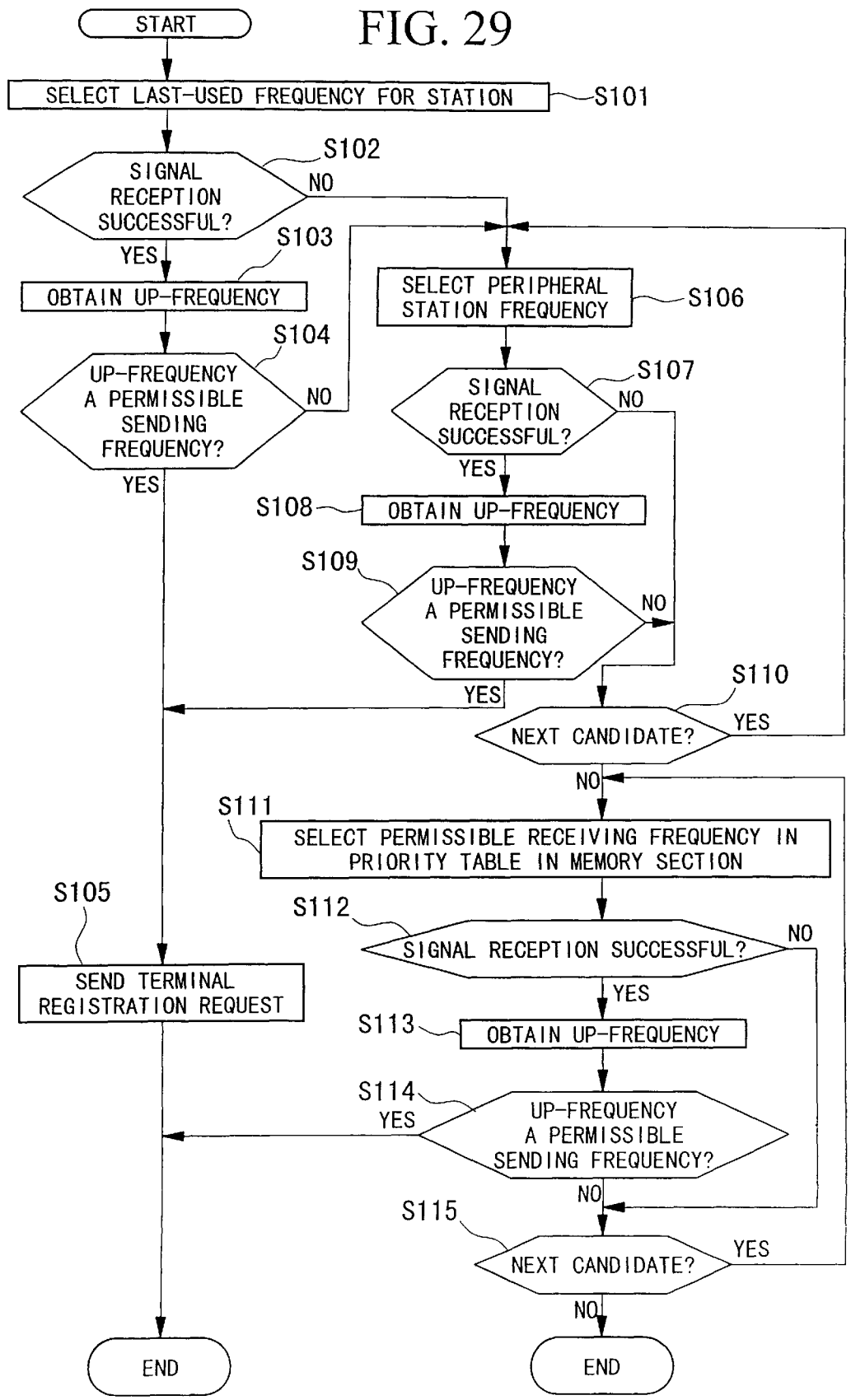
FIG. 29 is a flowchart for the operation of the terminal unit 5-1 shown in FIG. 25.

In the flowchart shown in FIG. 29, steps S101–S110 are the same as the steps S1–S10 in FIG. 24, therefore, explanations are omitted.

In FIG. 29, step S101 is executed after the priority table 24d is generated.

In step S110, when there are no candidates for a down-frequency, the selection section 25 checks from the top data in the priority table 24d stored in memory section 24, through the priority setting section 26, and selects a frequency corresponding to a channel number and assigns this frequency as the receiving frequency (step S111b) and stores the frequency in the memory section 24.

Next, it is examined whether the signal reception by the demodulator 22 was successful (step S112), and if successful, the received signal is demodulated and is forwarded to the received signal analysis section 23.

Next, the received signal analysis section 23 analyzes the received signal, and stores a down-frequency of the peripheral wireless station device in the memory section 24 and obtains up-frequency (step S113) which is forwarded to the judging section 28.

Next, the judging section 28 reads the permissible sending frequencies 27b stored in ROM 27, and compares it with the up-frequency received from the received signal analysis section 23, and checks whether the up-frequency received is permissible for signal transmission (step S114). This judgment is based on whether the received up-frequency matches the sending frequencies 27b stored in ROM 27. If the result indicates that it can be sent, the judging section 28 stores the up-frequency in the memory section 24. Then, the modulation section 29 uses the sending frequency 24a stored in the memory section 24 to send the registration request from the terminal unit 5-1 (step S105). Also, when there is no need for sending the terminal registration, it is possible to eliminate the step of sending the request.

Next, if signal reception was not possible in step S112 or if the up-frequency is not the permissible frequency in step S114, steps S111~S114 are repeated (step S115). Next, in step S115, if there are no other permissible receiving frequencies, the terminal unit 5-1 is not able to use the present managing district so that it is necessary to move to another managing district, and attempt the steps shown in FIG. 24.

In FIG. 29, steps S101~S104 and S106~S111 may be skipped, and after preparing the priority table 24d, step S111b may be executed immediately afterward.

As described above, because the wireless mobile device has information regarding the operational frequencies from the wireless station devices, if signal reception becomes difficult, information on the operational frequencies can be used to switch to another operational frequency. Switching the operational frequency provides an advantage that, because there is no change in the managing server for the mobile device, the connection can be maintained without having to go through the registration and approval processes even when communicating with other wireless station devices.

Also, use of the priority table indicating the most popular receiving frequencies provides an advantage that a selection of receiving frequency is facilitated and the system operates at an optimum efficiency.

Also, chronological switching of operational frequency provides an advantage that redundant terminal registration can be avoided and the use of unauthorized up-frequencies can be avoided because only the permissible up-frequencies are accepted. Because the permissible frequencies and the operational frequencies of the station devices are stored in the mobile device in the order of popularity, the probability of accessing an operational frequency and the process of selecting an operational frequency are improved significantly.

It is assumed that the operating channels had already been input in ROM when the terminal unit 5-1 is activated.

The program s shown in FIGS. 24, 29 may be recorded on a computer-readable recording media such as floppy discs, CD-ROM, opto-magnetic discs, IC cards, DVD-ROM, so that computer means can execute application programs to select an operational frequency.

The application programs are totally or partially recorded on portable memory media such as floppy discs and CD-ROM, and fixed memory devices such as hard discs. Application program may perform a part of the described functions, or may be operated in conjunction with pre-recorded programs stored in computer systems.

Computer-readable recording media include not only static memories, such as optomagnetic discs, but short-term dynamic memories used in transmitting programs and data through communication circuits such as Internet or telephone circuits, as well as other short-term memories such as volatile memories used in servers and client computer systems.

In other words, a computer-readable recording medium containing a frequency selection program for a wireless terminal unit should include processing steps of receiving a first up-frequency given by the wireless station device using a last receiving frequency of the wireless mobile device; judging whether or not the first up-frequency is a permissible sending frequency for the wireless mobile device, so that, if the up-frequency is permissible; sending a terminal registration request to the wireless station device using the up-frequency; however, if the last frequency is not useable, receiving a second up-frequency from a peripheral wireless station device using a down-frequency allocated to the peripheral wireless station device, judging whether or not the second up-frequency is a permissible sending frequency; and if the second up-frequency is permissible, sending the terminal registration request to the peripheral wireless station device using the second up-frequency; however, if the last receiving frequency and the second down-frequency of the peripheral wireless station device cannot be used by the wireless mobile device, then, searching in a memory section of the wireless mobile device for a permissible receiving frequency, by successively testing permissible receiving frequencies until a permissible receiving frequency that can be used by the wireless mobile device is found; receiving a third up-frequency from a wireless station device that sent the third up-frequency using the permissible receiving frequency; judging whether or not the third up-frequency is a permissible sending frequency, and if it is permissible, sending the terminal registration to the wireless station device that sent the third up-frequency.

Also, if the last-used receiving frequency and any of the down-frequencies of the peripheral stations cannot be used by the wireless mobile device, then, the subsequent steps presented above may be replaced with the following steps: searching for a receiving frequency that can be used by the wireless mobile device, by successively testing permissible receiving frequencies so as to find a station device whose down-frequency matches a permissible receiving frequency for the wireless mobile device, beginning with a down-frequency shared by the highest number of station devices until a receiving frequency that can be used by the wireless mobile device is found; receiving a third up-frequency from a station device using the receiving frequency; checking whether or not the third up-frequency received is a permissible sending frequency; and if it is permissible, sending the terminal registration to the wireless station device that sent the third up-frequency.

Further, the above program may directly proceed to the step of: searching for a receiving frequency that can be used by the wireless mobile device, by successively testing permissible receiving frequencies so as to find a wireless station device whose down-frequency matches a permissible receiving frequency for the wireless mobile device, beginning with a down-frequency shared by the highest number of wireless station devices until a receiving frequency that can be used by the wireless mobile device is found; receiving an up-frequency from a wireless station device using the receiving frequency; checking whether or not the up-frequency received is a permissible sending frequency; and if it is permissible, sending the terminal registration to the wireless station device that sent the up-frequency.

Obviously, numerous modifications and variations of the present invention are possible in light of the above teachings. It is therefore to be understood that within the scope of the appended claims, the invention may be practiced otherwise than as specifically described herein.

The present document claims the benefit of the earlier filing dates of JP 10-262099 filed Sep. 16, 1998, JP 10-294592, filed Sep. 30, 1998, JP 10-309228, filed Oct. 29, 1998, JP 10-309231, filed Jun. 29, 1998, and JP 10-361659, filed Dec. 18, 1998, the entire contents of each of which being incorporated herein by reference.

What is claimed is:

1. A wireless server system, for wirelessly connecting a terminal unit having a terminal device and a wireless mobile device to Internet, comprising:

at least one wireless server, including a home server for said wireless mobile device, configured to communicate information via the Internet; and a plurality of wireless station devices connected to said at least one wireless server and configured to conduct wireless communication with a terminal unit by way of said wireless mobile device, wherein said home server being within a communication range district of said plurality of wireless station devices, said terminal device being configured to communicate over the Internet by way of said wireless mobile device.

2. A wireless server system according to claim 1, wherein each wireless server of said at least one wireless server comprising:

a terminal approval managing section configured to allow the wireless mobile device to be connected to a predetermined wireless server of the at least one wireless server, by approving said wireless mobile device for connection in response to a terminal registration request sent from said wireless mobile device; and a terminal managing section configured to issue to said wireless mobile device an IP address available for use at a time of connecting said wireless mobile device to said predetermined wireless server of the at least at least one wireless server, and configured to register a connection of said mobile device.

3. A wireless server system according to claim 2, wherein:

said wireless server of the at least one wireless server, in response to a terminal registration request from said wireless mobile device for a connection to another wireless server that is not the home server, sends a request by way of the Internet to said home server to solicit a terminal approval and an IP address, and, when a terminal approval and an ID address are issued by said home server, approves a connection of said terminal unit to said another wireless server.

4. A wireless server system according to claim 3, further comprising:

a packet routing section that is invoked when a wireless server that is not a home server of the terminal unit is supporting communications on behalf of the terminal unit and when packet data addressed to said terminal unit arrives at another wireless server that has previously supported communications on behalf of the terminal unit, said packet routing section being configured to transfer said packet data to said presently communicating wireless server according to an IP address obtained from said home server.

5. A wireless server system according to claim 4, wherein:
when the wireless server that is not the home server for the terminal unit, and packet data addressed to said terminal unit is transferred to said terminal unit, a host server on the Internet that routed the packet data is configured to be advised of an identity of said proxy wireless server so that subsequent packet data are routed directly to said presently communicating wireless server without being sent to the another wireless server.

6. A wireless server system according to claim 1, wherein:
said at least one wireless server includes,
a broadcast information receiving section configured to receive information broadcast by way of a network connected to said at least one wireless server,
a broadcast level defining section having assigned broadcast levels for a plurality of terminal units for communicating with said at least one wireless server connected to said network, and
a broadcast information reconstruction section configured to reconstruct received information according to each broadcast level; and
said at least one wireless server being configured to distribute reconstructed received information prepared by said broadcast information reconstruction section to said plurality of terminal units.

7. A wireless server system according to claim 1, wherein:
said at least one wireless server includes,
a multi-cast information receiving section configured to receive multi-cast information by way of a network connected to said at least one wireless server;
a terminal information memory section having classifications and being configured to distribute multi-cast information to defined groups of terminal units; and
a destination deciding section configured to determine destinations for distributing multi-cast information according to said classifications.

8. A wireless server system according to claim 1, wherein:
said least one wireless includes,
a relay agent section so that, when it is necessary for a terminal unit presently communicating with said wireless server to receive an IP address from another wireless server, said relay agent section sends an IP address request made by said terminal unit to said another wireless server, and receives a reply packet from said another wireless server on behalf of said terminal unit.

9. A wireless server system according to claim 1, wherein:
said at least one wireless station device includes,
an IP address containing a same network address as a wireless server to which said wireless station device is connected so as to enable communication between said wireless server and said wireless station device using an Internet protocol.

10. A wireless, server system according to claim 1, wherein:
said at least one wireless station device includes,
a memory section configured to receive and store up-frequencies and down-frequencies of at least one of said plurality of wireless station devices and down-frequencies of a peripheral wireless station device received from an external source;
a read-only-memory section configured to store operational frequencies for sending and receiving data by said at least one of said plurality of wireless station devices; and
a judging section configured to compare up-frequencies and down-frequencies of said wireless station device stored in said memory section and operational frequencies stored in said read-only-memory section, so as to determine whether an operational frequency received from an external source is useable, wherein
when said judging section determines that said operational frequency is useable, said at least one of said plurality wireless station devices sends an up-frequency of said at least of said wireless station devices and a down-frequency of said peripheral wireless station device using a down-frequency of said at least one of said plurality of wireless station devices.

11. A wireless mobile device, connected to a terminal device of a terminal unit, for wirelessly connecting said terminal device to Internet by way of a wireless station device, comprising:
a memory section configured to store a last operational frequency used by said wireless mobile device and down-frequencies of a peripheral wireless station device;
a read-only-memory section configured to store permissible operational frequencies for sending and receiving data through said wireless mobile device; and
a judging section configured to compare frequencies stored in said memory section and permissible operational frequencies stored in said read-only-memory section so as to determine whether an operational frequency to be used by said wireless mobile device is useable, wherein
up-frequencies transmitted from said wireless station device are tested by successively using a last receiving frequency, said down-frequencies of said peripheral wireless station device and said permissible receiving frequencies so that a terminal registration request is transmitted only when an up-frequency received matches with a receiving frequency permitted for said wireless mobile device.

12. A wireless mobile device according to claim 11, further comprising:
a priority table generation section in the memory section configured to generate a priority table for efficiently selecting a receiving frequency from permissible receiving frequencies for said wireless mobile device, wherein
a receiving frequency that can be used as an up-frequency to send said terminal registration request can be selected from said permissible receiving frequencies with reference to said priority table.

13. A wireless mobile device, connected to a terminal device of a terminal unit, for wirelessly connecting said terminal device to Internet by way of a wireless station device, comprising:
a read-only-memory configured to store a plurality of permissible receiving frequencies and permissible sending frequencies, including a priority table generation section in a memory section configured to generate a priority table for efficiently selecting a receiving frequency from said permissible receiving frequencies; and
a judging section configured to compare operational frequencies of said wireless mobile device and operational frequencies stored in said read-only-memory section, and judge whether a frequency to be used by said wireless mobile device is useable, wherein
  a receiving frequency for receiving an up-frequency that can be used by said wireless mobile device to send a terminal registration request to said wireless station device is selected from said permissible receiving frequencies by consulting said priority table and successively testing receiving frequencies so as to receive an up-frequency sent from said wireless station device, and only when said up-frequency is a receiving frequency permitted for said wireless terminal unit, the terminal registration request is transmitted.

14. A wireless mobile device according to claim 13, wherein:
  said priority table is arranged in an order of a highest number of wireless station devices using same channels operating on same frequencies as permissible receiving frequencies of said wireless mobile device, according to a useable channel table defining useable channels for each wireless station device and a frequency table relating said useable channels to permissible receiving frequencies.

15. A method for wireless communication by performing a relay agent process in response to an IP address request made in a wireless server system for wirelessly connecting a terminal unit having a terminal device and a wireless mobile device to Internet, with at least one wireless server including a home server configured to communicate information via the Internet, a plurality of wireless station devices connected to said at least one wireless server and configured to conduct wireless communication with said terminal unit by way of said wireless mobile device, said home server being within a communication range district of said plurality of wireless station devices, said terminal device being configured to communicate over the Internet by way of said wireless mobile device, comprising the steps of:
  receiving an IP address request sent from said wireless mobile device;
  deducing the home server for said wireless mobile device according to a contents of said IP address request;
  transmitting said IP address to said home server on behalf of said wireless mobile device;
  receiving an IP address issued by said home server; and
  distributing said IP address to said wireless mobile device.

16. A method of providing wireless communication between a wireless station device and a wireless mobile device, comprising the steps of:
  receiving a first up-frequency provided by said wireless station device using a last receiving frequency of the wireless mobile device;
  judging whether said first up-frequency is a permissible sending frequency for said wireless mobile device, so that, if said up-frequency is permissible, a step of sending a terminal registration request to said wireless station device using said first up-frequency is performed; however, if the last frequency is not useable other steps are performed, the other steps including,
  receiving a second up-frequency from a peripheral wireless station device using a down-frequency allocated to said peripheral wireless station device,
  judging whether said second up-frequency is a permissible sending frequency, and if said second up-frequency is permissible, sending the terminal registration request to said peripheral wireless station device using said second up-frequency; however, if said last receiving frequency and said second down-frequency of said peripheral wireless station device cannot be used by said wireless mobile device, then,
    searching in a memory section of said wireless mobile device for a permissible receiving frequency for said wireless mobile device, by successively testing permissible receiving frequencies until a permissible receiving frequency that can be used by said wireless mobile device is found;
    receiving a third up-frequency from a wireless station device that sent the third up-frequency using said permissible receiving frequency;
    judging whether said third up-frequency is a permissible sending frequency, and if permissible, sending the terminal registration to said wireless station device that sent the third up-frequency.

17. A method of providing wireless communication between a wireless station device and a wireless mobile device, comprising the steps of:
  receiving a first up-frequency provided by said wireless station device using a last receiving frequency of the wireless mobile device;
  judging whether said first up-frequency is a permissible sending frequency for said wireless mobile device, so that, if said up-frequency is permissible a step of;
  sending a terminal registration request to said wireless station device using said first up-frequency is performed; however, if said last frequency is not useable other steps are performed, the other step including,
  receiving a second up-frequency from a peripheral wireless station device using a down-frequency allocated to said peripheral wireless station device,
  judging whether said second up-frequency is a permissible sending frequency; and if said second up-frequency is permissible, sending the terminal registration request to said peripheral wireless station device using said second up-frequency; however, if said last receiving frequency and said second down-frequency of said peripheral wireless station device cannot be used by said wireless mobile device, then, searching for a receiving frequency that can be used by said wireless mobile device, by successively testing permissible receiving frequencies so as to find a wireless station device whose down-frequency matches a permissible receiving frequency for said wireless mobile device, beginning with a down-frequency shared by a highest number of wireless station devices until a receiving frequency that can be used by said wireless mobile device is found; receiving a third up-frequency from a station device using said receiving frequency; checking whether the third up-frequency received is a permissible sending frequency; and if permissible, sending the terminal registration to the wireless station device that sent said third up-frequency.

18. A method for providing communication between a wireless station device and a wireless mobile device, comprising the steps of:
  searching for a receiving frequency that can be used by said wireless mobile device by successively testing permissible receiving frequencies so as to find a wireless station device whose down-frequency matches a permissible receiving frequency for said wireless mobile device, said successively testing step including beginning with a down-frequency shared by a highest number of wireless station devices until a receiving frequency that can be used by the wireless mobile device is found;

receiving an up-frequency from a wireless station device using said receiving frequency; and checking whether said up-frequency received is a permissible sending frequency, and if the up-frequency is permissible, sending the terminal registration to said wireless station device that sent said up-frequency.

19. A computer program product, containing a terminal connection program for providing a terminal unit connecting process for a wireless server said wireless server includes a terminal approval managing section configured to allow a wireless mobile device to be connected to the wireless server, by approving said wireless mobile device for connection in response to a terminal registration request sent from said wireless mobile device, and a terminal managing section configured to issue to said wireless mobile device an IP address available for use at a time of connecting said wireless mobile device to said wireless server, and configured to register a connection of said mobile device, said terminal connection program effecting the steps of:

approving a wireless mobile device in response to a terminal connection request from said wireless mobile device; and issuing an IP address presently available for use in response to an IP address request sent from said wireless mobile device.

20. A computer program product, containing a distribution program for broadcasting information divided into a classification of level groups for a wireless server, said wireless served includes a broadcast information receiving section configured to receive information broadcast by way of a network connected to a wireless server, a broadcast level defining section having assigned broadcast levels for a plurality of terminal units for communicating with the wireless server connected to said network, and a broadcast information reconstruction section configured to reconstruct received information according to each broadcast level, said at least one wireless server being configured to distribute reconstructed received information prepared by said broadcast information reconstruction section to said plurality of terminal units, said distribution program effecting the steps of:

receiving information broadcast to a network connected to the wireless server;

reconstructing the information received in said receiving step by consulting a broadcast level defining section having defined broadcast levels; and distributing reconstructed broadcast information to a terminal device connected to said wireless server.

21. A computer program product, containing a distribution program for multi-casting information for a wireless server, said wireless server including a multi-cast information receiving section configured to receive multi-cast information by way of a network connected to said at least one wireless server, a terminal information memory section having classifications and being configured to distribute multi-cast information to defined groups of terminal units and a destination deciding section configured to determine destinations for distributing multi-cast information according to said classifications, said distribution program effecting the steps of:

receiving multi-cast information;

deciding distribution destinations of said multi-cast information, by consulting terminal information; and distributing said multi-cast information according to distribution destinations thus determined in said deciding step.

22. A computer program product, containing a relay agent program for processing an IP address request for a wireless server, said wireless server including a relay agent section so that, when it is necessary for a terminal unit presently communicating with said wireless server to receive an IP address from another wireless server, said relay agent section sends an IP address request made by said terminal unit to said another wireless server, and receives a reply packet from said another network on behalf of said terminal unit, said relay agent program effecting the steps of:

processing an IP address request from said wireless mobile device;

deducing a home server of the said wireless mobile device according to contents of said IP address request;

issuing an IP address request to said home server on behalf of said wireless mobile device;

receiving an IP address issued by said home server; and distributing said IP address received to said wireless mobile device.

23. A computer program product, containing an operational frequency selection program for a wireless mobile device, said wireless mobile device including a memory section configured to store a last operational frequency used by said wireless mobile device and down-frequencies of a peripheral wireless station device, a read-only-memory section configured to store permissible operational frequencies for sending and receiving data through said wireless mobile device, a judging section configured to compare frequencies stored in said memory section and permissible operational frequencies stored in said read-only-memory section so as to determine whether an operational frequency to be used by said wireless mobile device is useable, wherein up-frequencies transmitted from said wireless station device are tested by successively using a last receiving frequency, said down-frequencies of said peripheral wireless station device and said permissible receiving frequencies so that a terminal registration request is transmitted only when an up-frequency received matches with a receiving frequency permitted for said wireless mobile device, said operational frequency selection program effecting the steps of:

receiving a first up-frequency given by said wireless station device using a last receiving frequency of said wireless mobile device;

judging whether said first up-frequency is a permissible sending frequency for said wireless mobile device, so that, if said up-frequency is permissible, a step of sending a terminal registration request to said wireless station device using the first up-frequency is performed;

however, if said last frequency is not useable, performing steps of receiving a second up-frequency from a peripheral wireless station device using a down-frequency allocated to said peripheral wireless station device, judging whether said second up-frequency is a permissible sending frequency, so that if said second up-frequency is permissible, a step of sending the terminal registration request to said peripheral wireless station device using said second up-frequency is performed;

however, if said last receiving frequency and said second down-frequency of said peripheral wireless station device cannot be used by said wireless mobile device, then, performing a step of searching in a memory section of said wireless mobile device for a permissible receiving frequency, by successively testing permissible receiving frequencies until a permissible receiving frequency that can be used by said wireless mobile device is found;

receiving a third up-frequency from a wireless station device that sent the third up-frequency using said permissible receiving frequency; and judging whether the third up-frequency is a permissible sending frequency, and if it is permissible, sending the terminal registration to said wireless station device that sent the third up-frequency.

24. A computer program product, containing an operational frequency selection program for a wireless mobile device, said wireless mobile device includes a priority table generation section in a memory section configured to generate a priority table for efficiently selecting a receiving frequency from permissible receiving frequencies for said wireless mobile device, a receiving frequency that can be used as an up-frequency to send a terminal registration request can be selected from said permissible receiving frequencies with reference to said priority table, said operational frequency selection program effecting the steps of:

receiving a first up-frequency given by said wireless station device using a last receiving frequency of the wireless mobile device;

judging whether said first up-frequency is a permissible sending frequency for said wireless mobile device, so that, if said first up-frequency is permissible, a step of sending a terminal registration request to said wireless station device using the first up-frequency is performed; however, if the last-used frequency is not useable, steps of receiving a second up-frequency from a peripheral wireless station device using a down-frequency allocated to said peripheral wireless station device, and judging whether said second up-frequency is a permissible sending frequency are performed;

and if said second up-frequency is permissible, sending the terminal registration request to said peripheral wireless station device using said second up-frequency; however, if said last receiving frequency and said second down-frequency of said peripheral wireless station device cannot be used by said wireless mobile device, then, additional steps are performed including searching for a receiving frequency that can be used by said wireless mobile device, by successively testing permissible receiving frequencies so as to find a wireless station device whose down-frequency matches a permissible receiving frequency for said wireless mobile device, beginning with a down-frequency shared by the highest number of wireless station devices until a receiving frequency that can be used by said wireless mobile device is found; receiving a third up-frequency from a station device using said receiving frequency; checking whether the third up-frequency received is a permissible sending frequency; and if permissible, sending the terminal registration to the wireless station device that sent said third up-frequency.

25. A computer-readable recording medium, containing an operational frequency selection program for the wireless mobile device, said wireless mobile device including a read-only-memory configured to store a plurality of permissible receiving frequencies and permissible sending frequencies, including a priority table generation section in a memory section configured to generate a priority table for efficiently selecting a receiving frequency from said permissible receiving frequencies; a judging section configured to compare operational frequencies of said wireless mobile device and operational frequencies stored in said read-only-memory section, and judge whether a frequency to be used by said wireless mobile device is useable, wherein a receiving frequency for receiving an up-frequency that can be used by said wireless mobile device to send said terminal registration to said wireless station device is selected from said permissible receiving frequencies by consulting said priority table and successively testing receiving frequencies so as to receive an up-frequency sent from said wireless station device, and only when said up-frequency is a receiving frequency permitted for said wireless terminal unit, a terminal registration is transmitted, said operational frequency selection program effecting the steps of:

searching for a receiving frequency that can be used by said wireless mobile device, by successively testing permissible receiving frequencies so as to find a wireless station device whose down-frequency matches a permissible receiving frequency for said wireless mobile device, beginning with a down-frequency shared by the highest number of wireless station devices until a receiving frequency that can be used by the wireless mobile device is found;

receiving an up-frequency from a wireless station device using said receiving frequency;

checking whether or not said up-frequency received is a permissible sending frequency; and if permissible, sending the terminal registration to the wireless station device that sent said up-frequency.

26. A wireless server system, for providing wireless communications connectivity between a terminal unit having a terminal device and a wireless mobile device to Internet, comprising:

means for relaying information between the terminal unit and Internet, said means for relaying information including at least one wireless server, including a home server for said wireless mobile device;

means for interconnecting said at least one wireless server and said terminal unit, wherein said home server being within a communication range district of said means for interconnecting, said terminal device being configured to communicate over the Internet by, way of said wireless mobile device;

means for receiving an IP address request sent from said wireless mobile device;

means for deducing the home server for said wireless mobile device according to a contents of said IP address request;

means for transmitting said IP address to said home server on behalf of said wireless mobile device;

means for receiving an IP address issued by said home server; and means for distributing said IP address to said wireless mobile device.

27. A wireless mobile device, connected to a terminal device of a terminal unit, for wirelessly connecting said terminal device to Internet by way of a wireless station device, comprising:

means for storing a last operational frequency used by said wireless mobile device and down-frequencies of a peripheral wireless station device;

means for storing permissible operational frequencies for sending and receiving data through said wireless mobile device; and means for comparing frequencies stored in said memory section and permissible operational frequencies stored in said means for storing permissible operational frequencies so as to determine whether an operational frequency to be used by said wireless mobile device is useable, wherein up-frequencies transmitted from said wireless station device are tested by means for successively using a last receiving frequency, said down-frequencies of said peripheral wireless station device and said permissible receiving frequencies so that a terminal registration request is transmitted only when an up-frequency received matches with a receiving frequency permitted for said wireless mobile device.

28. A wireless communications device comprising:

means for receiving a first up-frequency provided by a wireless station device using a last receiving frequency of a wireless mobile device;

means for judging whether said first up-frequency is a permissible sending frequency for said wireless mobile device, so that, if said up-frequency is permissible, means for sending a terminal registration request to said wireless station device using said first up-frequency is invoked; however, if the last frequency is not useable other mechanisms are invoked including, means for receiving a second up-frequency from a peripheral wireless station device using a down-frequency allocated to said peripheral wireless station device, means for judging whether said second up-frequency is a permissible sending frequency, and if said second up-frequency is permissible, sending the terminal registration request to said peripheral wireless station device using said second up-frequency; however, if said last receiving frequency and said second down-frequency of said peripheral wireless station device cannot be used by said wireless mobile device, then other mechanisms are invoked including, means for searching in a memory section of said wireless mobile device for a permissible receiving frequency for said wireless mobile device, by successively testing permissible receiving frequencies until a permissible receiving frequency that can be used by said wireless mobile device is found, means for receiving a third up-frequency from a wireless station device that sent the third up-frequency using said permissible receiving frequency, means for judging whether said third up-frequency is a permissible sending frequency, and if permissible, invoking means for sending the terminal registration to said wireless station device that sent the third up-frequency.

29. A system for providing communication between a wireless station device and a wireless mobile device, comprising:

means for searching for a receiving frequency that can be used by said wireless mobile device including means for successively testing permissible receiving frequencies so as to find a wireless station device whose down-frequency matches a permissible receiving frequency for said wireless mobile device, said means for successively testing beginning with a down-frequency shared by a highest number of wireless station devices until a receiving frequency that can be used by the wireless mobile device is found;

means for receiving an up-frequency from a wireless station device using said receiving frequency; and means for checking whether said up-frequency received is a permissible sending frequency, and if the up-frequency is permissible, sending the terminal registration to said wireless station device that sent said up-frequency.

* * * * *